(12) United States Patent
MacNaughtan et al.

(10) Patent No.: US 8,798,613 B2
(45) Date of Patent: Aug. 5, 2014

(54) SYSTEMS AND METHOD FOR TRIGGERING LOCATION BASED VOICE AND/OR DATA COMMUNICATIONS TO OR FROM MOBILE RATIO TERMINALS

(75) Inventors: Malcolm David MacNaughtan, Cherrybrook (AU); Christopher Ridgway Drane, Pymble (AU); Stephen Frank Brown, West Ryde (AU); Craig Andrew Scott, Mortdale (AU)

(73) Assignee: WaveMarket, Inc., Emeryville, CA (US)

( * ) Notice: Subject to any disclaimer, the term of this patent is extended or adjusted under 35 U.S.C. 154(b) by 501 days.

(21) Appl. No.: 12/733,724

(22) PCT Filed: Sep. 17, 2008

(86) PCT No.: PCT/AU2008/001374
§ 371 (c)(1),
(2), (4) Date: Jun. 25, 2010

(87) PCT Pub. No.: WO2009/036497
PCT Pub. Date: Mar. 26, 2009

(65) Prior Publication Data
US 2010/0291907 A1   Nov. 18, 2010

Related U.S. Application Data

(60) Provisional application No. 60/960,121, filed on Sep. 17, 2007.

(51) Int. Cl.
*H04W 4/00* (2009.01)
*H04W 24/00* (2009.01)

(52) U.S. Cl.
USPC ....................... 455/422.1; 455/456.1

(58) Field of Classification Search
USPC .............................. 455/422.1, 456.1
See application file for complete search history.

(56) References Cited

U.S. PATENT DOCUMENTS

| 5,045,861 | A | | 9/1991 | Duffett-Smith et al. |
|---|---|---|---|---|
| 5,524,136 | A | | 6/1996 | Barnoy et al. |
| 5,564,079 | A | | 10/1996 | Olsson |
| 5,666,651 | A | | 9/1997 | Wang |
| 5,905,953 | A | * | 5/1999 | Liu et al. ................ 455/433 |
| 5,950,125 | A | * | 9/1999 | Buhrmann et al. ........ 455/432.1 |
| 5,969,679 | A | | 10/1999 | Bolliger |

(Continued)

FOREIGN PATENT DOCUMENTS

| AU | 200066612 B2 | 10/2000 |
|---|---|---|
| AU | 200066612 B2 * | 4/2001 |

(Continued)

OTHER PUBLICATIONS

Mir et. al, "A Zone-Based Location Service for Mobile Ad Hoc Networks", 1NCC 2004, Jun. 2004.

(Continued)

*Primary Examiner* — Marisol Figueroa
(74) *Attorney, Agent, or Firm* — Dovas Law, P.C.

(57) ABSTRACT

Systems, methods and devices for monitoring the location of mobile radio terminal users for the purpose of detecting when they approach within range of one or more target locations in order to trigger voice and/or data communications to or from the network or other mobile radio terminals.

16 Claims, 15 Drawing Sheets

(56) References Cited

U.S. PATENT DOCUMENTS

| | | |
|---|---|---|
| 5,999,126 A | 12/1999 | Ito |
| 6,041,236 A | 3/2000 | Bernardin et al. |
| 6,052,064 A | 4/2000 | Budnik et al. |
| 6,061,021 A | 5/2000 | Zibell |
| 6,073,089 A | 6/2000 | Baker et al. |
| 6,088,598 A | 7/2000 | Marsolais |
| 6,097,939 A | 8/2000 | Jacobs |
| 6,104,344 A | 8/2000 | Wax et al. |
| 6,167,265 A | 12/2000 | Kim et al. |
| 6,185,422 B1 | 2/2001 | Mattila |
| 6,201,499 B1 | 3/2001 | Hawkes et al. |
| 6,205,326 B1* | 3/2001 | Tell et al. ............... 455/406 |
| 6,263,208 B1 | 7/2001 | Chang et al. |
| 6,266,534 B1 | 7/2001 | Raith et al. |
| 6,269,246 B1 | 7/2001 | Rao et al. |
| 6,327,474 B1 | 12/2001 | Ruutu et al. |
| 6,330,600 B1 | 12/2001 | Matchefts et al. |
| 6,356,763 B1 | 3/2002 | Kangas et al. |
| 6,360,094 B1 | 3/2002 | Satarasinghe |
| 6,393,294 B1 | 5/2002 | Perez-Breva et al. |
| 6,411,819 B1 | 6/2002 | Gutowski |
| 6,449,257 B1 | 9/2002 | Choi |
| 6,449,486 B1 | 9/2002 | Rao |
| 6,496,701 B1 | 12/2002 | Chen et al. |
| 6,529,165 B1 | 3/2003 | Brice et al. |
| 6,556,842 B1 | 4/2003 | Ericsson |
| 6,560,442 B1 | 5/2003 | Yost et al. |
| 6,567,381 B1 | 5/2003 | Jeon et al. |
| 6,584,314 B1 | 6/2003 | Haumont et al. |
| 6,587,835 B1 | 7/2003 | Treyz et al. |
| 6,591,116 B1 | 7/2003 | Laurila et al. |
| 6,631,262 B1 | 10/2003 | Wee |
| 6,711,404 B1 | 3/2004 | Arpee et al. |
| 6,728,539 B2 | 4/2004 | Kuwahara |
| 6,748,224 B1 | 6/2004 | Chen et al. |
| 6,782,265 B2 | 8/2004 | Perez-Breva et al. |
| 6,799,046 B1 | 9/2004 | Tang |
| 6,834,180 B1 | 12/2004 | Marshall |
| 6,856,805 B1 | 2/2005 | Raaf |
| 6,859,654 B1 | 2/2005 | Reynolds et al. |
| 6,947,734 B1 | 9/2005 | Toubassi |
| 6,947,835 B2 | 9/2005 | Kaplan et al. |
| 6,950,664 B2 | 9/2005 | Chen et al. |
| 6,961,587 B1 | 11/2005 | Vilppula et al. |
| 7,031,722 B2 | 4/2006 | Naghian |
| 7,079,850 B2* | 7/2006 | Cameron ............... 455/456.1 |
| 7,096,115 B1 | 8/2006 | Groth et al. |
| 7,158,790 B1 | 1/2007 | Elliott |
| 7,158,798 B2* | 1/2007 | Lee et al. ............... 455/456.3 |
| 7,233,800 B2 | 6/2007 | Laroia et al. |
| 7,289,763 B2 | 10/2007 | Dennison et al. |
| 7,505,433 B2 | 3/2009 | Yaqub et al. |
| 7,668,832 B2 | 2/2010 | Yeh et al. |
| 7,697,920 B1 | 4/2010 | McClain |
| 7,751,827 B2 | 7/2010 | Poykko et al. |
| 7,835,301 B1 | 11/2010 | Maufer |
| 8,315,905 B1 | 11/2012 | Adair |
| 2001/0022558 A1 | 9/2001 | Karr et al. |
| 2002/0042268 A1 | 4/2002 | Cotanis |
| 2002/0042269 A1 | 4/2002 | Cotanis |
| 2002/0101834 A1 | 8/2002 | Stanley |
| 2002/0111772 A1 | 8/2002 | Skidmore et al. |
| 2002/0128019 A1 | 9/2002 | Ben-Yair et al. |
| 2002/0164997 A1 | 11/2002 | Parry |
| 2002/0168989 A1 | 11/2002 | Dooley et al. |
| 2002/0173275 A1 | 11/2002 | Coutant |
| 2002/0193150 A1 | 12/2002 | Pritchard |
| 2003/0008668 A1 | 1/2003 | Perez-Breva et al. |
| 2003/0032404 A1 | 2/2003 | Wager et al. |
| 2003/0040318 A1 | 2/2003 | Fattouche |
| 2003/0043941 A1 | 3/2003 | Johnson et al. |
| 2003/0060214 A1 | 3/2003 | Hendrey et al. |
| 2003/0064788 A1 | 4/2003 | Walker et al. |
| 2003/0078042 A1 | 4/2003 | Miriyala et al. |
| 2003/0078055 A1 | 4/2003 | Smith et al. |
| 2003/0109274 A1 | 6/2003 | Budka et al. |
| 2003/0119501 A1 | 6/2003 | Kim |
| 2003/0125031 A1 | 7/2003 | Sung Lim et al. |
| 2003/0125045 A1 | 7/2003 | Riley et al. |
| 2003/0147362 A1 | 8/2003 | Dick et al. |
| 2003/0148771 A1 | 8/2003 | de Verteuil |
| 2003/0186710 A1 | 10/2003 | Muhonen et al. |
| 2003/0190916 A1 | 10/2003 | Celedon et al. |
| 2003/0208589 A1 | 11/2003 | Yamamoto |
| 2004/0018835 A1 | 1/2004 | Myers et al. |
| 2004/0037258 A1 | 2/2004 | Scherzer et al. |
| 2004/0116111 A1 | 6/2004 | Saunders |
| 2004/0132464 A1 | 7/2004 | Poykko et al. |
| 2004/0152470 A1 | 8/2004 | Spain |
| 2004/0157621 A1 | 8/2004 | Yamasaki et al. |
| 2004/0160365 A1 | 8/2004 | Riley et al. |
| 2004/0185822 A1* | 9/2004 | Tealdi et al. ............... 455/404.1 |
| 2004/0186776 A1 | 9/2004 | Llach |
| 2004/0199398 A1* | 10/2004 | Kubota ............... 705/1 |
| 2004/0203717 A1 | 10/2004 | Wingrowicz |
| 2004/0203880 A1 | 10/2004 | Riley |
| 2004/0203885 A1 | 10/2004 | Quaid |
| 2004/0225681 A1* | 11/2004 | Chaney et al. ............... 707/104.1 |
| 2004/0236547 A1 | 11/2004 | Rappaport et al. |
| 2004/0248589 A1 | 12/2004 | Gwon et al. |
| 2004/0259555 A1 | 12/2004 | Rappaport et al. |
| 2005/0012613 A1 | 1/2005 | Eckstein et al. |
| 2005/0040968 A1 | 2/2005 | Damarla et al. |
| 2005/0044564 A1 | 2/2005 | Stopniewicz et al. |
| 2005/0066325 A1 | 3/2005 | Mori et al. |
| 2005/0113117 A1 | 5/2005 | Bolin et al. |
| 2005/0134696 A1 | 6/2005 | Nath et al. |
| 2005/0136938 A1 | 6/2005 | Kang |
| 2005/0169183 A1 | 8/2005 | Lakkakorpi |
| 2005/0192031 A1 | 9/2005 | Vare |
| 2005/0202821 A1 | 9/2005 | Pischella |
| 2005/0210342 A1 | 9/2005 | Schwagmann |
| 2005/0227683 A1 | 10/2005 | Draluk et al. |
| 2005/0239478 A1 | 10/2005 | Spirito |
| 2005/0282540 A1 | 12/2005 | Motamedi et al. |
| 2005/0282544 A1 | 12/2005 | Oommen et al. |
| 2005/0283540 A1 | 12/2005 | Fux et al. |
| 2006/0019665 A1 | 1/2006 | Aghvami et al. |
| 2006/0019679 A1 | 1/2006 | Rappaport et al. |
| 2006/0025068 A1 | 2/2006 | Regan et al. |
| 2006/0025158 A1 | 2/2006 | Leblanc et al. |
| 2006/0052057 A1 | 3/2006 | Persson et al. |
| 2006/0064346 A1 | 3/2006 | Steenstra et al. |
| 2006/0087425 A1 | 4/2006 | Haeberlen |
| 2006/0205417 A1* | 9/2006 | Ju et al. ............... 455/456.5 |
| 2006/0221901 A1 | 10/2006 | Yaqub et al. |
| 2006/0227045 A1 | 10/2006 | Sheynblat |
| 2006/0229070 A1 | 10/2006 | LaDue |
| 2006/0234701 A1 | 10/2006 | Wang et al. |
| 2006/0270421 A1 | 11/2006 | Phillips et al. |
| 2007/0001808 A1 | 1/2007 | Kastelic et al. |
| 2007/0001867 A1 | 1/2007 | Rowe et al. |
| 2007/0087764 A1 | 4/2007 | Buckley et al. |
| 2007/0121520 A1 | 5/2007 | Shrikhande et al. |
| 2007/0123268 A1 | 5/2007 | Parata |
| 2007/0208495 A1 | 9/2007 | Chapman et al. |
| 2007/0232319 A1 | 10/2007 | Bells et al. |
| 2007/0259670 A1 | 11/2007 | Sakhpara |
| 2007/0270168 A1 | 11/2007 | Sheynblat |
| 2007/0297346 A1 | 12/2007 | Huismann et al. |
| 2008/0004037 A1 | 1/2008 | Achlioptas et al. |
| 2008/0030345 A1 | 2/2008 | Austin et al. |
| 2008/0061967 A1 | 3/2008 | Corrado |
| 2008/0070588 A1 | 3/2008 | Morin |
| 2008/0144082 A1 | 6/2008 | Kister |
| 2008/0183560 A1 | 7/2008 | Kaplan et al. |
| 2008/0194235 A1 | 8/2008 | Dalsgaard |
| 2009/0160939 A1 | 6/2009 | Fernandez et al. |
| 2009/0182630 A1 | 7/2009 | Otto et al. |
| 2009/0294538 A1 | 12/2009 | Wihlborg et al. |
| 2010/0167725 A1 | 7/2010 | Noldus et al. |
| 2010/0240399 A1 | 9/2010 | Roumeliotis et al. |
| 2011/0124399 A1 | 5/2011 | Dutilly et al. |
| 2011/0244919 A1 | 10/2011 | Aller et al. |

(56) References Cited

U.S. PATENT DOCUMENTS

| | | |
|---|---|---|
| 2011/0302024 A1 | 12/2011 | Gunawardana et al. |
| 2012/0040761 A1 | 2/2012 | Auterlo et al. |
| 2012/0215617 A1 | 8/2012 | Shah et al. |
| 2012/0253668 A1* | 10/2012 | Sheha et al. .......... 701/465 |

FOREIGN PATENT DOCUMENTS

| | | |
|---|---|---|
| DE | 29919376 U1 | 2/2000 |
| DE | WO 2007/115777 A1 | 10/2007 |
| EP | 0431956 A2 | 7/1990 |
| EP | 0874248 A2 | 10/1998 |
| EP | 0936758 A2 | 8/1999 |
| EP | 0982964 A2 | 3/2000 |
| EP | 1030531 A1 | 8/2000 |
| EP | 1120632 B1 | 8/2001 |
| EP | 1175115 A2 | 1/2002 |
| EP | 1235076 A1 | 8/2002 |
| EP | 1271101 A2 | 1/2003 |
| EP | 1304897 A1 | 4/2003 |
| EP | 0767594 B1 | 11/2003 |
| EP | 1677562 A1 | 7/2006 |
| EP | 1137305 B1 | 1/2008 |
| EP | 2083576 A1 | 7/2009 |
| GB | 2352134 A | 1/2001 |
| GB | 2358500 A | 7/2001 |
| GB | 2364617 A | 1/2002 |
| JP | 07-255079 A | 10/1995 |
| JP | 08-265824 A | 10/1996 |
| JP | 2001-330657 A | 11/2001 |
| JP | 2004-104349 A | 4/2004 |
| WO | WO 92/02105 A1 | 2/1992 |
| WO | WO 93/15569 | 8/1993 |
| WO | WO 95/35636 A1 | 12/1995 |
| WO | WO 97/11384 A | 3/1997 |
| WO | WO 98/12885 A2 | 3/1998 |
| WO | WO 98/48578 A2 | 10/1998 |
| WO | WO 9843450 | 10/1998 |
| WO | WO 99/13662 A | 3/1999 |
| WO | WO 00/18148 A | 3/2000 |
| WO | WO 00/28755 A1 | 5/2000 |
| WO | WO 0049826 | 8/2000 |
| WO | WO 01/03372 A | 1/2001 |
| WO | WO 01/37601 | 5/2001 |
| WO | WO 01/99082 A2 | 12/2001 |
| WO | WO 0195592 | 12/2001 |
| WO | WO 02/47421 | 6/2002 |
| WO | WO 02/073997 A1 | 9/2002 |
| WO | WO 02/082850 | 10/2002 |
| WO | WO 03/087869 | 10/2003 |
| WO | WO 2004034721 | 4/2004 |
| WO | WO 2004/047315 A2 | 6/2004 |
| WO | WO 2004/079478 A2 | 9/2004 |
| WO | WO 2004/080105 A2 | 9/2004 |
| WO | WO 2004/084022 A2 | 9/2004 |
| WO | WO 2005/009020 A1 | 1/2005 |
| WO | WO 2005/109695 A1 | 11/2005 |
| WO | WO 2006/026816 A2 | 3/2006 |
| WO | WO 2006/053835 A1 | 5/2006 |
| WO | WO 2006/059188 A1 | 6/2006 |
| WO | WO 2006087438 A1 | 8/2006 |
| WO | WO 2006/096922 A1 | 9/2006 |
| WO | WO 2006/096923 A1 | 9/2006 |
| WO | WO 2006/105618 A1 | 10/2006 |
| WO | WO 2006/105619 A1 | 10/2006 |
| WO | WO 2006/112561 | 10/2006 |
| WO | WO 2006/125085 | 11/2006 |
| WO | WO 2007/017691 A1 | 2/2007 |
| WO | WO 2007/020635 A2 | 2/2007 |
| WO | WO 2007/040320 A1 | 4/2007 |
| WO | WO 2007040320 | 4/2007 |
| WO | WO 2007/048176 | 5/2007 |
| WO | WO 2007/048177 | 5/2007 |
| WO | WO 2007/051223 A1 | 5/2007 |
| WO | WO 2007/071271 A1 | 6/2007 |
| WO | WO 2007/102816 A1 | 9/2007 |
| WO | WO 2008/055302 | 5/2008 |
| WO | WO 2008/059570 | 5/2008 |
| WO | WO 2008/109948 A1 | 9/2008 |
| WO | WO 2009/036497 | 3/2009 |
| WO | WO 2009/067766 | 6/2009 |
| WO | WO 2009080105 | 7/2009 |
| WO | WO 2009/124348 | 10/2009 |
| WO | WO 2009/124349 | 10/2009 |
| WO | WO 2010/022470 | 3/2010 |
| WO | WO 2010090558 | 8/2010 |

OTHER PUBLICATIONS

3GPP TR05.08, "Radio Subsystem Link Control", Nov. 2005.
3GPP SA WG2, "Voice Call Continuity between CS and IMS Study"
3GPP TR 23.806 V7 0.0, 1, Dec. 2005, pp. 1-153, XP002385067.
Specification 3GPP TS 23.048, "Technical Specification Group Core Network and Terminals; Security Mechanisms for the (U)SIM Application Toolkit", 2005-2006.
Specification 3GPP TS 25.304 "User Equipment (UE) Procedures in Idle Mode and Procedures for Cell Reselection in Connected Mode", 2011.
Specification 3GPP TS 03.22, "Radio Access Network; Functions Related to Mobile Station(MS) in Idle Mode and Group Receive Mode", 1999.
International Search Report of PCT/AU2006/001577 dated Nov. 28, 2006.
International Search Report for PCT/AU2008/001374 dated Nov. 17, 2008.
M. Hata, "Empirical formula for propagation loss in land mobile radio services" IEEE Transactions on Vehicular Technology, vol. VT-29, pp. 317-325, Aug. 1980.
T. Roos, P. Myllymaki, and H. Tirri, "A statistical modeling approach to location estimation," IEEE Transactions on Mobile Computing vol. 1, pp. 59-69, Jan. 2002.
T. Halonen J. Romero and J. Melero, GSM, GPRS and EDGE Performance; Evolution Towards SG/UMTS. John Wiley and Sons, 2nd ed., 2003.
L.M. Correia, Wireless Flexible Personalized Communications: COST 259 European Co-Operation in Mobile Radio Research. Wiley 2001.
IEEE Vehicular Technology Society Committee on Radio Propagation Coverage Prediction for Mobile Radio Systems Operating in the 800/900 MHz frequency range IEEE Transactions on Vehicular Technology: Special Issue on Mobile Radio Propagation, vol. 37, pp. 3-72, Feb. 1988.
3rd Generation Partnership Program, "3GPP TR 25.942 Radio Frequency (RF) System Scenarios," tech. rep., 3GPP, 2004.
Schwartz et al., "On the Distribution and Moments of Power Sums with Logonormal Components", Bell Sys. Tech, J., vol. 61, No. 7, pp. 1441-1463.
Balis P. G. et al. "UTD-Based Model for Prediction of Propagation Path Loss and Shadowing Variability in Urban Mobile Environments" IEE Proceedings: Microwaves, Antennas and Propagation, IEE, Stevenage, Herts, GB, vol. 144 No. 5 Oct. 9, 1997, pp. 367-371 XP006008788 ISSN: 1350-2417.
W.C.Y. Lee, Mobile Communications Engineering. McGraw-Hill, 1982.
Bernardin et al., "Cell Radius Inaccuracy: A New Measure of Coverage Reliability", IEEE Transactions on Vehicular Technology, vol. 47, No. 4, Nov. 1998.
W.H. Press S. A. Teukolsky, W.T. Vetterling & B.P. Flannery, "Numerical Recipes in C++; The Art of Scientific Computing", 2nd Ed, Feb. 2002, Cambridge University Press.
C.R. Drane, Positioning Systems—A Unified Approach, Lecture Notes in Control and Infromation Sciences, Springer Verlag, Oct. 1992.
P.L.H.A.S. Fischer, "Evaluation of Positioning Measurement Systems," T1P1.5/97-110, Dec. 1997.
A.M. Zoubir and B. Boobash, "The Bootstrap and Its Application in Signal Processing," IEEE Signal Processing Magazine, 15(1):56-76, Jan. 1998.

(56) References Cited

OTHER PUBLICATIONS

Martin Hellenbrandt, Rudolf Mathar and Scheibenbogen Markus, "Estimating Position and Velocity of Mobiles in a Cellular Radio Network," IEEE Transactions on Vehicular Technology, 46(1): 65-71, Feb. 1997.

Section 2.7 of Mobile Radio Communications 2nd Ed. Steele and Hanzo, IBSN 047197806X,J. Wiley & Sons Ltd., 1999.

B. Matsumori T1P1.5/98-600 "Radio Camera System and Location Fingerprinting Technology", Presentation Submission to Location Standards Working Group T1P1.5 by U.S. Wireless 1998.

Annex I of GSM 05.05 "Digital cellular Telecommunication System (Phase 2)", Radio Transmission and Reception, 2001.

S.R. Saunders & A. Aragon-Zavala, Antennas and Propagation for Wireless Communications Systems: 2nd Ed., Wiley 2007.

Doru-Petru Munteanu, Onoriu Bradeanu, Petrica Ciotirnae, Constantin-Julian Vizitiu: "Zone Profile Generation for Location Based Services and Traffic Analysis", 12th WSEAS International Conference on Communications, Heraklion, Greece, Jul. 23-25, 2008, pp. 386-390.

Specification 3GPP TS 31.111—Sections 6.4, 6.616, 6.6.21 and 6.6.22.

"Computational Geometry in C (Cambridge Tracts in Theoretical Computer Science)", Joseph O'Rourke, Cambridge University Press; 2000 edition, ISBN 0521649765.

European Search Report dated Nov. 4, 2010 for EP 08714391.3.
International Search Report dated Sep. 20, 2004 for PCT/AU2004/000983.
European Search Report dated Mar. 15, 2007 for EP 04737602.5.
International Search Report dated Dec. 5, 2005 for PCT/AU2005/001358.
International Search Report dated May 7, 2008 for PCT/AU2008/000344.
International Search Report dated Apr. 26, 2006 for PCT/AU2006/000347.
International Search Report dated Apr. 26, 2006 for PCT/AU2006/000348.
European Search Report dated Feb. 19, 2010 for EP 06721361.1.
International Search Report dated May 31, 2006 for PCT/AU2006/000479.
International Search Report dated Jun. 29, 2006 for PCT/AU2006/000478.
European Search Report dated Dec. 22, 2009 for EP 06721360.3.
European Search Report dated Jul. 23, 2010 for EP 06705018.7.
International Search Report dated Jan. 24, 2007 for PCT/AU2006/001479.
International Search Report dated Dec. 19, 2006 for PCT/AU2006/001576.
International Search Report dated Feb. 19, 2008 for PCT/AU2007/001706.
OMA Download Architecture—Version 1.0, Jun. 25, 2004.
International Search Report dated Jan. 15, 2009 for PCT/AU2008/001783.
International Search Report dated Jun. 1, 2009 for PCT/AU2009/000436.
International Search Report dated Nov. 25, 2009 for PCT/AU2009/001123.
International Search Report dated May 11, 2009 for PCT/AU2009/000438.
European Search Report dated Feb. 19, 2009 for EP 06705017.9.
International Search Report dated Nov. 3, 2011 for PCTAU2011/001038.
European Search Report dated Mar. 2, 2012 for European Patent Application 09729670.1.
European Search Report dated Feb. 24, 2012 for European Patent Application 09729862.4.
European Search Report dated Feb. 22, 2012 for European Patent Application 08714391.3.
European Search Report dated Mar. 12, 2012 for European Patent Application 06790414.4.
European Search Report dated Mar. 9, 2012 for European Patent Application 08800009.6.
European Search Report dated Mar. 12, 2012 for European Patent Application 06804431.2.
European Search report dated Jul. 25, 2012 for European Patent Application 06790349.2.
Office Action dated Nov. 13, 2012 for U.S. Appl. No. 12/857,888.
Office Action dated May 16, 2013 for U.S. Appl. No. 12/857,888.

* cited by examiner

SYSTEMS AND METHOD FOR TRIGGERING LOCATION BASED VOICE AND/OR DATA COMMUNICATIONS TO OR FROM MOBILE RATIO TERMINALS

PRIORITY

This application is the U.S. National Phase application of International Application No. PCT/AU2008/001374, filed Sep. 17, 2008, which designates the United States and was published in English, which in turn claims priority from U.S. Provisional Patent Application No. 60/960,121, filed on Sep. 17, 2007. The foregoing related applications, in their entirety, are hereby incorporated by reference.

CROSS-REFERENCE TO RELATED APPLICATIONS

The present application is related to the following co-pending patent applications:
  PCT/AU2005/001358 entitled "Radio Mobile Unit Location System"
  PCT/AU2006/000347 entitled "Enhanced Mobile Location Method and System"
  PCT/AU2006/000348 entitled "Enhanced Mobile Location"
  PCT/AU2006/000478 entitled "Enhanced Terrestrial Mobile Location"
  PCT/AU2006/000479 entitled "Mobile Location"
  PCT/AU2008/000344 entitled "Enhanced Zone Determination." The entire content of each of these applications is hereby incorporated by reference. Furthermore, the entire contents of the following references is hereby incorporated by reference. W. C. Y. Lee, *Mobile Communications Engineering*, McGraw-Hill, 1982, and P. L. H. A. S. Fischer, "Evaluation of positioning measurement systems", T1P1.5/97-110, December 1997, and IEEE VTS committee, "Coverage prediction for mobile radio systems operating in the 800/900 MHz frequency range", IEEE Transactions on VTC, Vol. 37, No. 1, February 1998, 3GPP TS 05.08, and C. R. Drane, *Positioning Systems, a Unified Approach*, Springer Verlag, 1992.

FIELD

The present inventions provide systems, methods and devices for delivering, alerting, or activating voice and/or data communications to a radio terminal based on the radio terminal being within a certain geographical location. In certain aspects, the present inventions provide systems, methods and devices for delivering targeted voice and data communications to a radio terminal that are triggered based on the radio terminal being within a certain geographically location.

BACKGROUND

Mobile telecommunications networks, such as CDMA2000 in the U.S., and the Global System for Mobile communications (GSM) and Universal Mobile Telecommunication System (UMTS) in Europe, provide services other than cellular voice services. For example, mobile telecommunications networks can provide Location Based Services (LBS). LBS are services that exploit knowledge about where a mobile radio terminal user is located.

One particular function of LBS is to define specific geographic regions associated with services. Such regions are sometimes referred to as zones. In some cases a service provider may choose to offer a service within such a zone.

For example, in one application a particular store or chain may wish to know when a registered customer approaches a store. To accomplish this, the application may transmit a targeted advertisement perhaps accompanied by a time limited discount offer to entice recipients into the store. To operate such an application with a network based location system, periodic location measurements would have to be performed at, for example, polling at 10 minute intervals. Each of these location measurements would require the mobile to be activated, incurring a cost in terms of network resources and battery usage in the mobile. As an indicative cost, in some markets, mobile operators currently charge a similar rate per request to that charged for Short Message Service (SMS). In this example, the location requests might continue for an extended period of days or even weeks without the customer being located near the store. The result would be a very large accumulated cost for the location transactions without the store owner having the opportunity to send a single advertisement. Multiply this over large numbers of users and thousands of zones and the cost as well as the drain on network resources would be unacceptable. Network providers, store owners and other similar potential users of such a system will not use services under such terms.

Some handset based solutions currently exist. For example, a solution in which a Global Positioning System (GPS) receiver is integrated with the handset. These types of systems can provide handset location information. However, a disadvantage of this solution is the relative low penetration of GPS enabled handsets in the marketplace. The same problem exists with GPS Plus systems. This means that location based services using such handsets can be offered to only a small percentage of mobile subscribers. Further, reliable operation of GPS and GPS Plus receivers is generally limited. A further limitation of GPS based solutions for these types of applications is the significant battery depletion associated with use of the GPS module. A further limitation is that many zone based services are likely to be designed for indoor environments in shopping malls and hotels for instance where GPS reception is unreliable.

Another existing handset based solution provides a coarse Cell Identity (CID) based position calculation. This uses the location of the base station currently serving the mobile. The mobile knows the identity of the serving base station. If the mobile has available a table of base station identifiers and corresponding locations then an approximate location can be calculated. While this approach avoids the repeated location transaction cost, it suffers from a major disadvantage due to the inaccuracy of the locations. In some cases the errors can be several kilometers. While techniques are known for obtaining improved accuracy using more sophisticated algorithms, these are unsuitable for implementation either on a handset or more particularly on a Subscriber Identity Module (SIM) card due to the very limited processing and memory resources.

The limitations described in the previous paragraphs and other limitations can be overcome using systems, methods and devices in which the location of the user can be monitored with an acceptable transaction cost. For the foregoing reasons, there is a need for a location based systems, methods and devices for delivering, alerting, or activating voice and/or data communications to or from a radio terminal based on the radio terminal being within a certain geographic location that is designed to operate for a multitude of users while also minimizing the network signaling load and maximizing handset battery power consumption. There is also a need for systems, methods and devices that can handle and manage a plurality of users and a plurality of zones. There is also a need for systems, methods and devices that are scaleable.

SUMMARY

Embodiments disclosed herein solve these problems and other problems and provide certain advantages as described.

In certain embodiments, methods and systems are characterized by the steps of defining a plurality of zones, each zone having a zone profile; storing at least one zone profile; determining a zone status by measuring radio signal parameters and comparing the radio signal parameters with the at least one zone profile; and if the zone status has changed, triggering an action associated with the zone. In some aspects, these methods and systems may be performed by a zone server, a client operating on a mobile radio terminal, or any suitable combination thereof.

In certain embodiments, methods and systems are characterized by the steps of defining a plurality of zones, each zone having of a zone profile; storing at least one zone profile; determining a zone status by measuring radio signal parameters and comparing the radio signal parameters with the at least one zone profile; if the zone status has changed, triggering an action associated with the zone; and periodically updating the at least one stored zone profile. In some aspects, these methods and systems may be performed by a zone server, a client operating on a mobile radio terminal, or any suitable combination thereof.

In certain embodiments, a mobile radio terminal is characterized by a network transceiver; a processor executing a zone provisioning and monitoring application coupled to the network transceiver; a memory storing a plurality of zone profiles coupled to the processor; wherein each zone profile is associated with a zone status and at least one action; wherein the zone provisioning and monitoring application is adapted to receive radio signal parameter measurements from the network transceiver and to determine the zone status by comparing the radio signal parameter measurements with a zone profile; and wherein if the zone provisioning and monitoring application determines that the zone status of a zone profile has changed, the processor performs the associated action.

In certain embodiments, a SIM card is configured to perform a method characterized by the steps of receiving a plurality of zones, each zone having a zone profile; storing the plurality of zone profiles; determining a zone status by measuring radio signal parameters and comparing the radio signal parameters with the at least one zone profile; and if the zone status has changed, triggering an action associated with the zone.

In certain embodiments, an applet is stored in a processor readable memory, wherein the applet is configured to perform a method characterized by the steps of receiving a plurality of zones, each zone having a zone profile; storing the plurality of zone profiles; determining a zone status by measuring radio signal parameters and comparing the radio signal parameters with the at least one zone profile; and if the zone status has changed, triggering an action associated with the zone.

In certain embodiments, methods and systems of enabling a user of a mobile radio terminal to retrieve a zone profile are characterized by the steps of providing a web service adapted to communicate via a network; storing at least one zone profile; communicating a web page to a mobile radio terminal, wherein the web page allows a user to browse information identifying the at least one zone profile; receiving a request for a selected zone profile from a mobile radio terminal; and communicating the selected zone profile to the mobile radio terminal.

BRIEF DESCRIPTION OF THE DRAWINGS

These and other features, aspects, and advantages disclosed herein will become better understood with regard to the following description, appended claims, and accompanying drawings where:

DETAILED DESCRIPTION

The present inventions will now be described in detail with reference to one or more embodiments of the inventions, examples of which are illustrated in the accompanying drawings. The examples and embodiments are provided by way of explanation only and are not to be taken as limiting to the scope of the inventions. Furthermore, features illustrated or described as part of one embodiment may be used with one or more other embodiments to provide a further new combination. It will be understood that the present inventions will cover these variations and embodiments as well as variations and modifications that would be understood by the person skilled in the art.

Throughout the specification, the terms "mobile radio terminal," "zone," "zone profile," "zone status," "zone reliability," and "leakage" will be used. "Mobile radio terminal" is used synonymously with terms such as "mobile station," "mobile phone," "user equipment," "cell phone," or "handset" and encompasses any kind of mobile radio terminal including Personal Digital Assistants (PDAs), laptop and other mobile computers, and pagers. A "zone" is defined as a geographic region within a radio telecommunications network. As described in more detail below, a "zone profile" is a quantitative characterization of the radio parameters that may be measured by a mobile terminal located within the zone. "Zone status" is a determination of whether a mobile radio terminal is inside or outside of a given zone. "Zone reliability" is the degree to which, when the mobile radio terminal is within a specified zone, the system correctly returns an in-zone indication. "Leakage" is the degree to which, when the mobile radio terminal is outside a specified zone, the system erroneously returns an in-zone indication. In the following descriptions, reference is also made to cellular base stations and other types of wireless access node. The term "cell" is used synonymously with terms such as "base station" and "BTS". The term "access point" is used to refer in a general way to any cell or Wi-Fi specific "access point".

Figure 1:
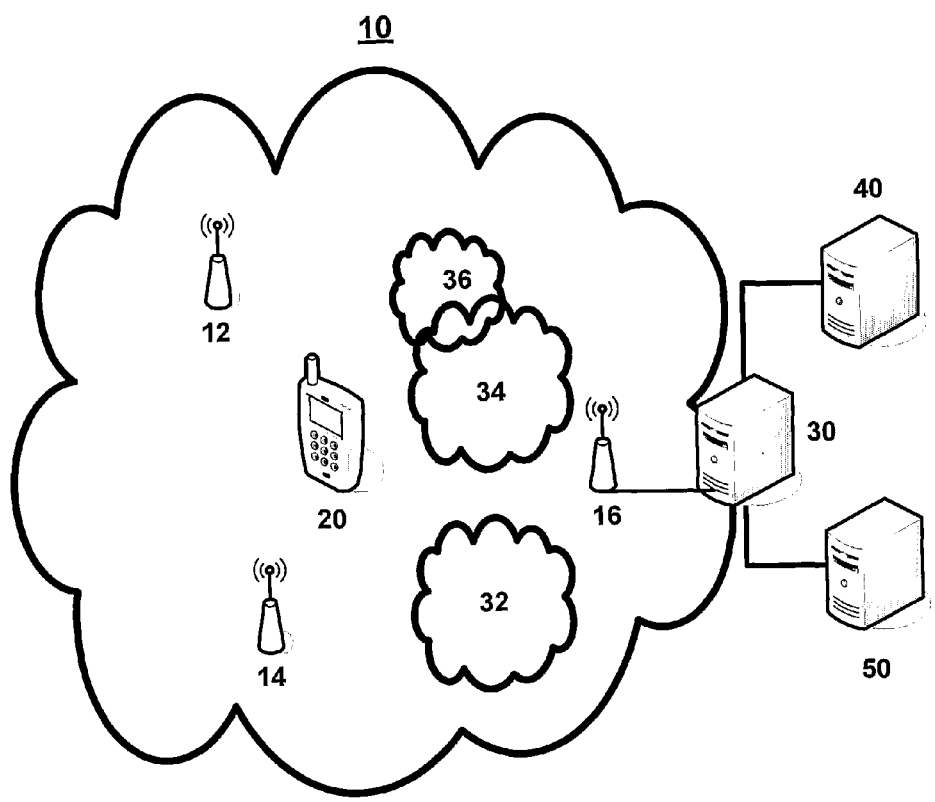
FIG. 1 illustrates a radio communications network in which zones are defined in accordance with certain embodiments.

FIG. 1 shows an exemplary radio communications network 10 having transmitters or base transceiver stations 12, 14, and 16 and in which three zones are defined: Zone A (32), Zone B (34), and Zone C (36); mobile radio terminal 20 executing a zone provisioning and monitoring application; and a zone server 30. In certain embodiments, a single zone or multiple zones can be defined and supported simultaneously, including for example, home, work, city districts and other zones. These zones may overlap completely or partially and/or may be contained entirely within another zone. The zone sizes may be any suitable size for the application. Additionally, embodiments disclosed herein are suitable for monitoring the location of a plurality of mobile terminals, relative to one or more zones, with improved resolution both in time and/or location.

In certain embodiments, the reliability of such zone determinations will be at least about 50%, at least about 65%, at least about 75%, at least about 80%, at least 85%, at least about 90%, at least about 95%, at least about 98%, at least about 99%, or at least about 99.5%. Furthermore, it is to be understood that different zones may have different reliability. In certain embodiments, the reliability of the zone determinations will be between 50% and 100%, between 50% and 99%, between 75% and 99%, between 75% and 100%, between 85% and 100%, between 85% and 98%, between 90% and 100%, between 90% and 99%, between 95% and 99%, between 95% and 100%, or between 97% and 100%. In certain embodiments, the reliability of such the zone determinations will be at least about 30%, about 50%, about 65%, about 75%, about 80%, 85%, about 90%, about 95%, about 98%, about 99%, or about 99.5% and these reliabilities will be present in at least 10%, 15%, 20%, 35%, 50%, 65%, 75%, 85%, 95%, or 100% of the zones.

Another advantage of embodiments disclosed herein is that the reliability of zone status determination may not be significantly degraded when the mobile radio terminal is located indoors or in an urban environment (e.g. a large city). Compare this to typical GPS-based location systems that operate very poorly indoors and in urban environments. For example, in certain embodiments the reliability of zone determination may be approximately the same regardless of whether the mobile radio terminal is located indoors or outdoors (in an urban or non-urban environment). The reliability of such zone determinations indoors and outdoors may be at least about 50%, at least about 65%, at least about 75%, at least about 80%, at least 85%, at least about 90%, at least about 95%, at least about 98%, at least about 99%, or at least about 99.5%. In alternative embodiments of the present disclosure the reliability of determining the zone status when the mobile radio terminal is located indoors may be within 5%, 10%, 15%, 20%, or 25% of the reliability of determining the zone status when the mobile radio terminal is located outdoors. Additionally, the reliability of determining the zone status when the mobile radio terminal is located in an urban environment may be within 5%, 10%, 15%, 20%, or 25% of the reliability of determining the zone status when the mobile radio terminal is located in a non-urban environment.

One advantage to the embodiments disclosed herein is that the systems, methods, and devices disclosed are able to determine if a radio terminal is within a number of zone sizes going from large to medium to small. Another advantage to the embodiments disclosed herein is the ability to have greater zone reliability as to when a radio terminal is within the zone for the smaller zones created. For instance, zones that have been created within the system that have a zone size of between 5 m and 20 m, between 10 m and 30 m, between 20 m and 50 m, between 25 m and 200 m, between 30 m and 100 m, and between 5 m and 200 m, may have reliability of at least about 50%, at least about 65%, at least about 75%, at least about 80%, at least 85%, at least about 90%, at least about 95%, at least about 98%, at least about 99%, or at least about 99.5%.

Another advantage to the embodiments disclosed herein is that a plurality of radio terminals and a plurality of zones can be operated in a network without excessive polling and the associated costs to the network and the radio terminal of such polling. The costs associated with embodiments of the present disclosure may be defined in terms of capex and opex. Capex may be defined as the cost associated with deployment of additional messaging capacity for communicating with all the terminals enrolled in the service. Opex may be defined as the operators' real cost per message. For example, assuming that the network has a finite messaging capacity, using some of that capacity to run an advertising service represents a cost of operation for the service.

Advantageously, embodiments of the present disclosure may increase capex and opex by less than about 2, less than about 5, less than about 10, less than about 20, less than about 25, less than about 50, less than about 60 or less than about 100 messages (e.g. SMSs or USSD transmissions) per subscriber enrolled in the service per day. Alternatively, embodiments of the present disclosure may increase overall capex and opex by less than about 1%, 3%, 5%, 8%, 10%, 15%, 20%, or 30% additional required network signaling capacity. The capex and opex requirements may vary depending on the subscribers' movements triggering zone status changes and profile cache maintenance.

In certain aspects the embodiments disclosed herein can be operated without excessive polling, for example, use of the embodiments disclosed would only add approximately 1%, 3%, 5%, 8%, 10%, 15%, 20%, or 30% more polling over the normal polling that would be done by the network. Another advantage to the embodiments disclosed herein is that a plurality of radio terminals and a plurality of zones can be operated in a network without overusing the resources of the terminal or the network, for example using too much battery power from the terminal. For instance, in exemplary embodiments, the location of a handset with respect to about 1, 5, 10, 20, 25, 50, 60 or 100 zones can be monitored with less than about 1%, 5%, 10%, 20%, or 30% decrease in battery life compared to the normal standby time.

Another advantage to the embodiments disclosed herein is that a plurality of radio terminals and a plurality of zones can be operated in a network without excessive attendant cost and consumption of network bandwidth. In certain aspects the embodiments disclosed herein can be operated without excessive attendant cost to the network, for example, use of the embodiments disclosed would only add approximately 0.05%, 0.1%, 0.2%, 0.5%, 1%, 1.25%, 1.5%, 2%, 3%, 5%, or 10% more attendant cost over the normal attendant cost that would incurred by the network. In certain aspects the embodiments disclosed herein can be operated without excessive consumption of network bandwidth, for example, use of the embodiments disclosed would only add approximately 0.01%, 0.05%, 0.1%, 0.2%, 0.5%, 1%, 1.25%, 1.5%, 2%, 3%, 5%, or 10% more consumption of network bandwidth over the normal network bandwidth that would be incurred.

Another advantage to the embodiments disclosed herein is that a plurality of radio terminals and a plurality of zones that can be operated in a network without excessive battery impact on the subscriber's mobile terminal associated with repeated network polling. In certain aspects the embodiments disclosed herein can be operated with a battery impact on the subscriber's mobile terminal of less then approximately 0.5%, 1%, 3%, 5%, 10%, 12%, 15%, 20%, 25%, 30%, 40%, 50%, or 60% over normal battery life. The battery impact, zone sizes, additional polling, reliability, attendant cost, consumption of network bandwidth, and other factors and/or limitations disclosed herein may be combined in various ways in certain embodiments.

In certain embodiments, the systems and methods disclosed herein can be used to monitoring the location of up to about 2%, about 10%, about 20%, about 40%, about 60%, about 80%, about 95%, or about 100% of the wireless subscribers on a particular network provider relative to one or more zones. In certain embodiments, the systems and methods disclosed herein can be used to monitoring the location of less than, or equal to, the majority of wireless subscribers, greater than the majority of wireless subscribers, or substantially all of the wireless subscriber on a particular network provider relative to one or more zones. In certain embodiments, the systems and methods disclosed herein can be used to monitoring the location of up to 2%, 10%, 20%, 40%, 60%, 80%, 95%, or 100% of the radio terminals that are able to connect to at least one wireless service provider in a predetermined geographical location, or a service area, relative to one or more zones. In certain embodiments, the systems and methods disclosed herein can be used to monitoring the location of less than, or equal to, the majority of wireless subscribers, greater than the majority of wireless subscribers, or substantially all of the radio terminals that are able to connect to at least one wireless service provider in a predetermined geographical location, or a service area, relative to one or more zones. In certain embodiments, the number of terminals that can be monitored may be limited to those terminals that have registered, or opted in, for at least one application. In other embodiments, the number of terminals that can be monitored may be a combination of those that have registered, or opted in, with terminals that have not registered, or opted in. In certain embodiments, the number of zones that may be available will only be limited by the networks capacity. In certain embodiments, the number of zones that may be made available can be from 2 to 10, 2 to 1000, 5 to 1000, 10 to 1000, 50 to 1000, 50 to 10,000, 500 to 10,000, or 400 to 20,000. The number of zones can be combined in combinations with any of the above descriptions of the number of terminals. In certain embodiments, the number of terminals and number of zones that can be used will only be limited by the networks capacity. Certain embodiments disclosed herein are suitable for monitoring the location of a large number of mobile terminals, relative to a large number of zones, with improved reliability both in time and/or location.

In operation, a system according to certain embodiments involves defining one or more zones in terms of zone profiles. One or more of these zone profiles are then stored in any one or a combination of a mobile radio terminal 20, the zone server 30, and/or radio network components such as the HLR/VLR. The profiles to be associated with any given mobile radio terminal may be determined based on the subscriber profile as described in detail herein. In some embodiments, the zone profiles stored on the mobile radio terminal 20 are periodically updated and managed by the mobile radio terminal 20, and/or the zone server 30. An application running on the mobile radio terminal 20 periodically determines the zone status or statuses by measuring radio signal parameters and comparing these measurements with the zone profiles stored on the terminal 20. If a specific zone status has changed, the mobile radio terminal 20 and/or the zone server 30 may take one or more actions associated with that zone such as transmitting an SMS and/or displaying a message. Each of these steps will be described in more detail below.

A zone profile is a quantitative characterization of the radio parameters that may be measured by a mobile terminal located within the zone. A profile may consist of one or more elements relating to cells in the vicinity of the zone and to the different types of parameters that may be measured by a terminal. If users of the service are likely to have mobile devices capable of operating on more than one type of radio network, a zone profile may include parameters corresponding to the access points of the different networks. As an example for a dual mode handset capable of GSM/UMTS cellular operation as well as WIFI, the zone profiles may feature elements corresponding to both cells and WIFI access points. For mobile devices which do include a location capability, for instance GPS, a zone profile transmitted to the device for monitoring may also include a definition of the zone in terms of location coordinates and extent. In the event that a user with a GPS enabled mobile device, enters a particular zone and has the GPS device activated at the time, the zone monitoring client on the device will incorporate the GPS measurements in the zone status determination, Synthesizing these with the wireless network based observations enables the system to exploit the multiple sources of information in a consistent and reliable zone status decision. The elements of the profile are designed to reflect parameter values that may be observed in the zone, and optionally with some representation of the expected variation of the parameter values within the zone. For example, in the case of cell identification parameters, the profile may contain one or more cell ID values together with associated model parameters as disclosed in PCT/AU2008/000344 entitled "Enhanced Zone Determination." For IEEE 802.11 networks, the profile may contain one or more MAC addresses and associated model parameters. For WIMAX networks the profile may contain one or more base station identifiers and associated model parameters such as RSSI ranges, as defined for GSM profiles. The zone profile may be derived in a variety of ways. In some embodiments, the system may include a server 50 that interacts with the zone server 30 to define each zone. In these embodiments, the server 50 may instruct the zone server 30 to create a new zone definition with specific parameters including a unique identifier. In other embodiments directed to mobile advertising, the system may include an ad server 50 that interacts with the zone server 30 to define each zone. In these embodiments, the ad server 50 may instruct the zone server 30 to create a new zone definition with specific parameters including a unique identifier.

For example, the server 50 may provide a location and request the zone server to derive a zone definition using propagation models as described below. In this case the location may be defined in terms of, for example, geographic coordinates in a shared reference frame or a civic address. Instead of, or in addition to, a zone derived using radio propagation modeling, a zone may be derived from one or more radio parameter measurements made from within the zone as described below. In these instances, the server 50 may include in a provisioning request the details of a mobile terminal that will provide the measurements from which the zone definition may be derived.

In certain embodiments the server 50 may also requests the zone server 30 to establish associations between a zone and one or more subscribers identified by a suitable identifier, such as an MSISDN or IMSI, or other identifier that would enable the zone server to distinguish the subscriber(s). MSISDN or IMSI are preferable for cases where the zone monitoring is carried out on a SIM card. In cases where the zone monitoring is carried out by a client installed on a mobile device, while MSISDN or IMSI could still be used (derived from a SIM card installed in the device), alternative identifiers could include the IMEI of the device or a unique identifier assigned by the server when the client software first connects to the server. The zone server could then establish the associations, and where appropriate, transmit the zone definition to the zone provisioning and monitoring application on the mobile terminal(s). The decision as to whether to transmit a zone definition to a subscriber terminal is based on one or more decision criteria as described below. For each zone defined the process is repeated.

In some embodiments, the profile is derived in part or in whole from measurements made by a mobile radio terminal 20 from within the zone. These measurements may include, for example, Wi-Fi access point MAC addresses, cell identifiers, channel frequencies, other identification codes such as base station identity codes or scrambling codes, timings including round trip timings or time differences, signal level measurements including RSSI or RSCP or any combination thereof. The measurement process involves performing one or more measurement cycles while the terminal is within the zone. In each measurement cycle the required zone profile measurements are recorded. In one form of this embodiment, the measurements are made repeatedly at a configurable rate (also called the measurement period). In some embodiments, the measurement cycles may range from 1 second to 10 seconds, 5 seconds to 15 seconds, 10 seconds to 50 seconds, 30 seconds to 3 minutes, 1 minute to 5 minutes, or 2 minutes to 20 minutes. Furthermore, the measurements may also be collected one at a time, at representative points by selecting a menu item to trigger the addition of a new measurement. Between 1 and 5 measurements, between 2 and 8 measurements, between 3 and 10 measurements, between 5 and 20 measurements, between 10 and 50 measurements, or between 25 and 100 measurements may be required to adequately characterize the zone. For larger zones between 1 and 5 measurements, between 3 and 8 measurements, between 5 and 20 measurements, between 10 and 50 measurements, between 25 and 100, between 50 and 250 measurements, between 200 and 1000 measurements, or between 500 and 5000 measurements may be required to adequately characterize the zone. In some embodiments, it may not be necessary to limit the time or the number of measurements made during the zone initialization. In these situations, the person taking the measurements may determine the duration of measuring and the number measurements to be made. A menu entry may be provided on the terminal for example, to conclude the measurement phase. Combinations of various ways to collect measurements are contemplated as well.

Once the measurements are taken from within the zone, they are processed to generate a zone profile. In certain embodiments, the processing could occur within the handset. Processing occurring within the handset includes any combination of the handset, a SIM, USIM or R-UIM that is inserted in the handset, or an additional processor or smart card inserted into the handset.

In other embodiments, the processing of the measurements may be distributed, or partially distributed, among the handset, one or more network elements within the radio communications network and/or one or more elements outside the radio communications network. For example, measurements could be taken by the mobile radio terminal 20 and then some or all of the measurements could be transmitted to the server 30 for processing. Additionally, the measurements could be partially processed in the server 30, and then transmitted to an external processor 40 for complete or further processing. The results of the processing could then be sent to the network server 30 and/or mobile radio terminal 20. In certain embodiments, the external processor 40 may be a third party system or may be part of the service provider's system. Any other combination of data transmission paths could be used.

The types of measurements available may vary depending on the application, the measurement capabilities of the mobile terminal as well as the type of radio network and the bearer used to carry the data. For instance in a GSM network, where a SIM card is used to host the mobile terminal component of the system, the measurements may include serving cell identifiers, ARFCNs, BSICs and received signal levels, or combinations thereof. In another example, where the network is a UMTS network, the measurements may include one or more serving cell identifiers, one or more pilot channel (CPICH) signal level (RSCP) measurements, one or more round trip delay (RTT) measurements and one or more time difference measurements (SFN-SFN offsets), or combinations thereof. In yet another example, where the network is a CDMA network, the measurements might include one or more base station IDs, one or more pilot channel (PICH) received levels, one or more PN offsets and one or more round trip delays, or combinations thereof. In one aspect, the measurements that may be obtained include the identity of the serving cell. In an alternative aspect, the measurements may include received signal power (RxLev) for mobile radio terminals. In other cases, the measurements may correspond to multiple different sources, including for example a device with cellular as well as Wi-Fi and GPS capabilities, in which case the measurements collected might span GSM, UMTS, WIFI & GPS observations.

Some measurements are only available when the mobile has an established connection with the network. Examples of such measurement include Timing Advance in GSM networks and RTT in UMTS networks. Additional measurements of this type can improve the accuracy of the location calculation. Some applications might have higher quality of service (QoS) or accuracy requirements. To satisfy such application requirements, the mobile may initiate a connection with the network, gather one or more timing measurements and then close the connection. This additional step would be performed in situations where a recent timing measurement is not available and the QoS requirements necessitate such a measurement. The connection may be a voice, data, GPRS, other type of connection, or combinations thereof, that enables a timing advance measurement to be obtained. The one or more timing measurements are then incorporated with the other measurements used for zone determination.

In certain embodiments, the measurements made by the mobile 20 are limited in duration to a certain time period. This time period may range from about between 5 s and 20 s or between 10 s and 30 s or between 20 s and 2 minutes or between 1 minute and 5 minutes or between 3 minutes and 15 minutes or between 10 minutes and 1 hour or any combination of these ranges may be sufficient to gather the measurements. The system may permit a user to roam around in the desired zone for this period during which measurements are collected. Advantageously, in certain embodiments it may be desirable to limit the duration of the measurement period and in this way the user is discouraged from making measurements beyond the approximate intended extent of the zone.

For large zones, the specified duration may allow the user a larger window of time in which to collect measurements at sample points in the desired zone. The duration may also be varied by the network operator based on different service offerings associated with different sized zones, having different pricing levels or structures. The desired zone sizes may vary depending on the application or service. For instance in a some zone applications, a zone size of between 2.5 m$^2$ and 20 m$^2$, between 5 m$^2$ and 20 m$^2$ or between 10 m$^2$ and 30 m$^2$ or between 20 m$^2$ and 50 m$^2$ or between 40 m$^2$ and 250 m$^2$ or between 100 m$^2$ and 500 m$^2$ or between 300 m$^2$ and 2000 m$^2$ or between 1000 m$^2$ and 5000 m$^2$ or any combination of these ranges may be suitable. In this case, a duration between 5 s and 20 s or between 10 s and 30 s or between 20 s and 2 minutes or between 1 minute and 5 minutes or between 3 minutes and 15 minutes or between 10 minutes and 1 hour or any combination of these ranges may be sufficient to gather the measurements. In another service targeted to larger commercial enterprises or properties, a larger zone size may be suitable, for example from 10 m$^2$ to 35 m$^2$ or from 25 m$^2$ to 75 m$^2$ or from 40 m$^2$ to 200 m$^2$ or between 100 m$^2$ and 800 m$^2$ or between 500 m$^2$ and 5000 m$^2$ or between 2000 m$^2$ and 25000 m$^2$ or any combination of these ranges. In this example, suitable measurement time intervals may range from 10 s to 50 s or from 30 s to 3 min or from 1 min to 5 min or from 2 min to 30 min or from 10 min to 2 hours or from 1 hour to 4 hours or any combination of these ranges.

In some applications, an account representative of a wireless access provider may be responsible for collecting the measurements that define the zone using the mobile radio terminal 20. In these cases the embodiments provide an alternative mode of operation whereby the account manager has the ability to control, or partially control, the duration of the zone definition measurements. Furthermore, the measurements may also be collected one at a time, at representative points by selecting a menu item to trigger the addition of a new measurement. Depending on the size of the area to be included within the zone between 5 and 20 measurements or between 10 and 50 measurements or between 25 and 100 or between 60 and 500 or between 250 and 1000 or between 500 and 2500 measurements may be required to adequately characterize the zone. For larger zones perhaps comprising multiple buildings larger numbers of measurements may be needed. For instance between 50 and 250 measurements or between 200 and 1000 measurements or between 500 and 5000 or between 2000 and 10000 measurements. In some applications, it may not be necessary to limit the time or the number of measurements made during the zone initialization. In this case, it may be at the user's discretion as to how long or how many measurements are made. A menu entry may be provided on the terminal for example, to conclude the measurement phase.

In certain embodiments, Base Station Identification (BASE_ID) and optionally Pilot Power (Ec/I0) may be measured in a CDMA (IS95) network for example. As with GSM and UMTS networks, a series of measurements may be recorded from within the zone. The measurements may correspond to any combination of the members of the active set, the candidate set, the neighboring set and the remaining set of cells maintained by the mobile terminal. In a CDMA network, the mobile terminal divides searching into three windows, SEARCH_WIN_A, SEARCH_WIN_N and SEARCH_WIN_R to gather information to support the handover process. In these windows, the mobile terminal gathers information about these four types of cells which collectively include all cells in the network.

In certain embodiments, the server may optionally conduct a zone alignment check as described in more detail below to ensure that the measurements are valid. If the check is done, and the measurements are deemed to be valid, the system will proceed to generate the profile. If the measurements are deemed to be invalid (i.e. inconsistent with the zone location), then the registration request will be denied.

In certain embodiments, the profile may be generated entirely, or partially, by radio network propagation modeling as is well known in the art. The model uses information on the configuration of the radio network including, but not limited to, one or more of the following: the location of cell sites or access points, the height and orientation of transmitting antennas, the radiation pattern of the antennas as well as the channel frequencies and any other codes allocated to each cell. The model also covers the loss in signal power as radio signals travel from transmitter to receiver. Such models are well known in the radio communications field. Predicted received signal powers can be generated for any or all cells in the network. These power levels can also be used to derive interference level estimates so that the received quality of a signal from any particular cell can be predicted. The application of network model for predicting received signal levels and interference levels is well known. Detailed references exist in the literature including, Mobile Communications Engineering. McGraw-Hill, 1982, and "Evaluation of positioning measurement systems" T1P1.5/97-110, December 1997, and IEEE VTS committee, "Coverage prediction for mobile radio systems operating in the 800/900 MHz frequency range," IEEE Transactions on VTC, Vol. 37, No 1, February 1998.

In certain embodiments where the zone is designed to cover a certain location, the location may be specified as the latitude and/or longitude of that address. Alternatively the location may be specified as the civic address of the location and a lookup performed on a lookup table to translate this into the same coordinate frame in which the network cell site locations are defined. The predicted received signal levels for all cells, as received in the zone are compared and a detectability criterion applied to select those cells that are likely to be measured and reported by a mobile terminal. A similar process is applied for zones where the profile is also required to cover WIFI access points. Typically the detectability criterion for cellular elements would be a predicted carrier to interference (including noise) value greater than a threshold. For example in a GSM network, a C/(I+N) threshold of +9 dB could be applied. For a UMTS network, the equivalent threshold could be a CPICH Ec/I0 level of −20 dB. Other threshold values depending on the network and application may range from about −26 dB to about +15 dB, (for example, −26 dB to −12 dB, −22 dB to −6 dB, −20 dB to −12 dB, −15 dB to 0 dB, −12 dB to +3 dB, −6 dB to +12 dB, −3 dB to +15 dB and +3 dB to +15 dB etc.).

Alternative criteria such as comparing predicted power levels against a threshold or selecting a number of the strongest predicted cells could also be employed. The present embodiment illustrates a feature of this invention, which is to serve as a translator for zone definitions. It is often convenient for operators and users of zone services to conceive of zone locations and extents in spatial terms, most commonly in terms of a geographic coordinate frame or alternatively in spatial terms with reference to some landmark, perhaps a street address. The radio parameter measurements which actually serve to define the zone span an entirely different dimension however. Certain embodiments provide a translation facility between the terms in which operators and users describe a zone and the actual radio parameter measurements needed to operate such a zone. In less precise zone systems where for instance the zone is defined simply in terms of the serving cells, this translation although necessary, may not be complex and therefore can be done mentally or by hand if the locations of the cell sites in the vicinity of the zone are known. For precise zone definitions however, where additional radio parameter measurements must be used to achieve the finer spatial discrimination, this translation process becomes significantly more complex. One aspect of the present invention provides this complex translation facility.

If additional information on the network configuration parameters which affect the serving cell selection is available then these can be incorporated in the probability calculations as well. Such information in GSM systems may include, without limitation, BCCH Allocation lists per cell, C1 and C2 thresholds as well as penalty times. The GSM idle mode cell selection process is described in 3GPP TS 05.08. In a UMTS system, such information may include, without limitation, Qqualmeas, or Qrxlevmeas. The User Equipment (UE) cell re-selection process is described in 3GPP TS 25.304.

An extension to the use of modeling tools can be used where real measurement data is available for the region of interest. So-called drive-test data if it has been collected in the target zone can be incorporated in the profile generation process. This drive-test data may, for example, provide accurate measurements of shadowing or other deviations in the radio propagation environment. These measurements may be used to further refine the radio propagation model.

In certain embodiments, WI-FI access point MAC address and RSSI may be measured. A series of such measurements may be recorded from within the zone. The measurements may correspond to any number of access points (APs) that can be detected by the terminal within the zone. In the case of terminals which are dual mode capable, measurements pertaining to a cellular network may also be collected to enable a degree of consistency checking due to the more permanent nature of cellular network infrastructure and cell ID assignments compared to WI-FI APs which may be more subjected to relocation or hardware replacement (resulting in a change of MAC address).

In certain preferred embodiments, the profile definition is generated by combining predictions from a modeling tool with measurements made by a terminal within the zone. At least one advantage of this embodiment is that if the terminal did not report any measurements of a particular nearby cell or WIFI AP, the modeling tool predictions may indicate a sufficiently high probability that the particular access point will still be included in the profile. In addition, using only measured access points usually will lead to a relatively small profile containing only those cells with a significant probability of serving. The remaining neighboring access points in this case are not in the profile and as a result have to be treated equally when observed. It should be noted, however, that those access point which are closer to the zone (although not reported during the few measurement cycles) are more consistent with the terminal being in the zone than other access points a greater distance from the zone. Therefore by combining the measured values for the strongest access points with predicted values for weaker access points, greater resolution may be achieved in treating observations of other neighboring access points. This may help preserve zone stability when the terminal is within the zone. This could happen, for instance, when a cellular terminal briefly reselects to a nearby neighboring cell that was not measured as a serving cell during the registration process.

In operation, the set of measurements may be transformed into a profile by completing unknown fields using the network database and/or network parameters and adding additional elements needed by the zone decision process. For example, unknown cell IDs may be added by searching in the network database for the closest cell to the reported serving cell having this ARFCN and BSIC as described in more detail below when discussing ambiguous measurements. The unknown ARFCN and BSIC for the serving cell are added by looking up these parameters in the network database based on the reported cell ID.

During the profile generation process, an allowance for variation in power levels (Log Normal standard deviation, also referred to as sigma) may be added by the server for use in the zone decision process. In one embodiment, the sigma values may be set to a default value of decibels. In practice these might be set to any value between 3 and 9 dB or between 6 and 15 dB or between 12 and 25 dB depending on the application and the nature of the environment in which the zone is to be defined. Optionally the sigma values in the profile may be set differently for different cells based, for example, on their local environment. In a dense urban area larger values would typically be used, for instance between 9 dB and 15 dB, or between 12 dB and 20 dB or between 14 dB and 25 dB. For less dispersive environments or environments with less clutter smaller values may be suitable, for instance between 3 dB and 9 dB or between 6 dB and 12 dB or between 8 dB and 15 dB. The values may also be varied according to characteristics of the respective cells or access points such as antenna height.

The allowance for the variation in the power levels can be adjusted to account for other variations due to effects such as multipath. One suitable representation for the received signal level is a statistical log normal distribution. Alternative models include Rayleigh and Rician distributions. These may be suitable depending on the specific application. For example, a zone associated with an indoor or mixed area may be more suitably modeled with a Rayleigh distribution since there is a lesser likelihood of a direct line of sight to the cell antenna. Conversely a zone associated with chiefly outdoor areas may be more suitably characterized with a Rician model. The expected variation may also be suitably represented by other measures such as inter-quartile range.

Many other types of measurements may be utilized for determining profiles such as timing measurements. In UMTS for instance, Round Trip Time (RTT) measurements for the cells in the active set may be utilized. In this case, reference measurements may be taken during the initialization phase. For each cell and parameter, an entry is then added to the zone profile representing a typical value for this parameter along with a value representing the expected statistical variation of this parameter within the zone. When evaluating a set of measurements against this profile, a cost is computed as illustrated for power levels above wherein the difference between the measured value of the parameter and the value in the profile is calculated and scaled by the statistical scaling parameter to obtain a cost for combining with the costs associated with the other measurements. In similar fashion other radio parameter measurements may be incorporated in the process such as time differences. Indeed any radio parameter measurement for which a typical value and a measure of its variation within the zone can be obtained may be used in similar fashion.

In some cases, the radio parameter measurements may not include a cell identifier. This may be for instance due to a limitation of a mobile terminal or a characteristic of the radio network. In such cases alternative identification parameters may be used, such as a Location Area Code (LAC) in the GSM network or a combination of channel frequency and other parameter such as a scrambling code.

For a system where the user is responsible for at least a part of the measurements used in defining the zone, it may be an application requirement to apply checks to ensure that the user has performed the measurements in the area nominated in the service contract. In one aspect, the present invention provides such checks by first applying the measurements to a location system to calculate an estimate of the location from where the user measurements have been made. Examples of appropriate methods of obtaining the approximate location of the mobile radio terminal 20 include those as described in co-pending patent application numbers: PCT/AU2005/001358; PCT/AU2006/000347, and PCT/AU2006/000348.

The results of this calculation can then be compared against the nominal location of the zone (based for example on a reverse geo-code of the specified street address) and if the two are within an acceptable distance of each other then the registration process proceeds. What constitutes an acceptable distance may vary from network to network and from application to application. As an example, a threshold on the order of the average local cell site separation may be suitable. Otherwise the registration may be rejected or other steps initiated, requiring the user to repeat the registration. In the case of an advertising zone, offered to a retailer in a particular retail complex, and in which the advertiser will perform the registration, the location validation May employ a threshold which encompasses the entire complex but which is small enough to discriminate between this complex and the next nearest retail complex.

In some embodiments, a large zone size may be desirable. In these embodiments, a zone profile may include the Mobile Country Code (MCC) and Mobile Network Code (MNC), followed by one or more cell entries, each having: a collection of parameter values including identifiers such as Location Area Code (LAC), Routing Area Code (RAC), CellID, channel parameters such as broadcast channel frequency and also radio signal parameters values such as rxLev, and a probability value.

For example, to generate a countrywide zone, (on all mobile networks) the MCC would be populated but the MNC would be zero. A single cell entry would also be populated with zero LAC & CellID values but with the desired probability value. Setting this single probability value would allow control over the degree of hysteresis (described in more detail below) if the terminal was in the rare scenario of a boundary area between two countries. Table 1 shows a typical zone profile for such as case covering all of Australia.

TABLE 1

| MCC | 505 | | | |
|---|---|---|---|---|
| MNC | 0 | | | |
| LAC | CellID | ARFCN | BSIC | Probability |
| 0 | 0 | 0 | 0 | 0.200 |

For a countrywide zone on a single mobile network only, both MCC & MNC would be populated. Table 2 shows a typical zone profile for such as case covering all of Australia, but only on the Telstra network:

TABLE 2

| MCC | 505 | | | |
|---|---|---|---|---|
| MNC | 1 | | | |
| LAC | CellID | ARFCN | BSIC | Probability |
| 0 | 0 | 0 | 0 | 0.200 |

For regional zones, a profile with the MCC & MNC would be defined together with one or more cell entries. In this case each cell entry would have a valid LAC assigned but the CellID would be zero, meaning that any cell having the specified LAC would be included in the zone. The probability parameter could also be populated to control the rate of change of zone state following LAC changes. Additional entries for neighboring LACs could be added with low probability values to achieve some hysteresis in the zone status as a terminal in a LAC boundary area reselected between LACs. The profile format comprising up to N entries would enable very large areas of up to N LACs to be covered. Some additional size could be achieved if required by bitmasking one or more of the least significant digits of the LAC where appropriate. An extra field in the cell entry could indicate when a bitmask should be applied to the last digit or digits of the LAC. This field could be a bitmask itself or could be a Boolean variable to indicate that a predetermined bitmask should be applied.

For zones smaller than a single LAC, for example an area of fractional regions spanning portions of multiple LACs, a profile comprising multiple cell entries could be used. In this case both the LAC and CID fields would be populated for each cell entry and the probability field would be set as appropriate to achieve the desired transient response. For example, zones having sizes of the order of up to N serving cell coverage areas could be defined with the profile format consisting of up to N cell entries. In cases where a larger area is required, but with finer resolution than could be achieved simply using LAC areas, the effective coverage area could be increased by applying a bitmask to the CellID. For example, it is typical in cellular networks to assign CellIDs per site with consecutive numbers of the form ABCDX. For a 3-sector site, this would mean the sectors typically have IDs ABCD1/2/3. It is also common practice where dual band sites are deployed to extend this numbering scheme between bands so that in the previous case the 1800 MHz band sectors would have IDs ABCD5/6/7. Using this approach, the area defined by a profile of N cell entries can be typically increased by a factor of between 1 and 6, in many cases yielding an area comparable to that covered by a single LAC.

Advantageously, using the schemes described above it is possible to define zone sizes ranging from an entire country down to small areas of a few tens of meters.

Once the profiles have been defined, they are then stored in any one or a combination of the mobile radio terminal 20, the zone server 30, and/or radio network components such as the HLR/VLR. If the profiles are generated by the mobile radio terminal 20, they may be transmitted to the zone server 30 and/or radio network components via any suitable radio network transmission medium such as Short Message Service (SMS), Multimedia Message Service (MMS), General Packet Radio Service (GPRS), Unstructured Supplementary Service Data (USSD), High-Speed Circuit-Switched Data (HSCSD), High-Speed Packet Access (HSPA) or High-Rate Packet Data (HRPD). Likewise, if the profiles are generated by the zone server 30, they may be transmitted to the mobile radio terminal 20 via any suitable radio network transmission medium such as any of the above and/or Wireless Application Protocol (WAP) Push.

Figure 2:
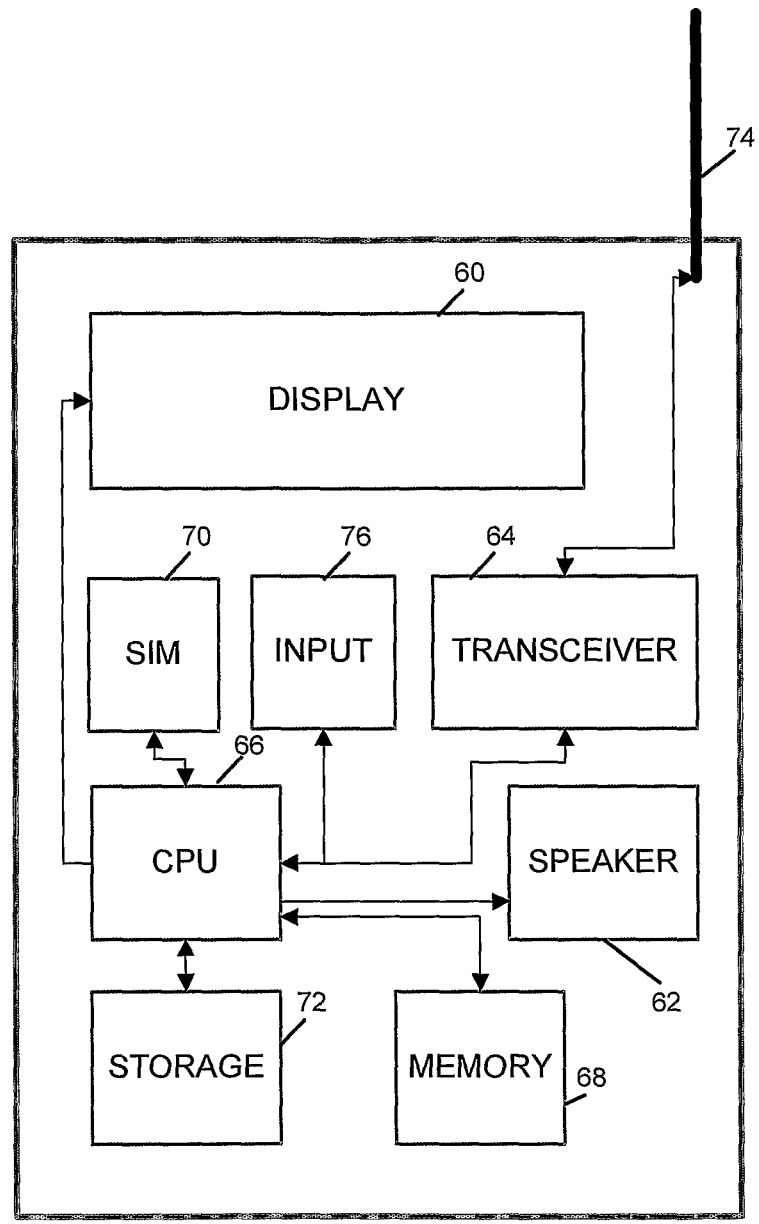
FIG. 2 illustrates an exemplary mobile radio terminal in accordance with certain embodiments.

FIG. 2 shows an exemplary GSM mobile terminal 20 according to an exemplary embodiment illustrating necessary components to perform the procedures relating to certain of the systems disclosed herein. The mobile radio terminal 20 may be any type of handset or PDA or indeed cellular equipped laptop and may operate over any 2G or 3G radio communications network such as GSM, UMTS, or CDMA. The mobile terminal 20 has a display 60 that allows the user to visually read information and may allow the user to view multimedia information such as video. The mobile terminal 20 may also provide voice or sound output through an optional speaker 62. The Mobile terminal 20 may further comprise a network transceiver 64 to receive transmissions from and to transmit requests to network 10, a central processing unit (CPU) 66 for controlling and executing all necessary procedures, a memory (e.g., SDRAM) 68, a Subscriber Identity Module (SIM) card 70, a data storage unit 72, an antenna 74, and one or more inputs 76 for inputting information into mobile terminal 20. In certain embodiments, CDMA handsets may include a Removable User Identity Module (R-UIM) and UMTS handsets may include a Universal Subscriber Identity Module (USIM). The data storage unit 72 can be, for example, a hard disk magnetic or optical storage unit, as well as a CD-ROM drive or a flash memory such as Secure Digital, MultiMediaCard or CompactFlash card. Input 76 may be, for example, a numeric keypad, a keyboard, a software keyboard touch screen, a touch screen (in combination with the display 60), a mouse, a pointing device such as pointing pen, etc.

The SIM card is a specific instance of a smart card or security/trust token for secure wireless communication networks, i.e., in this instance for the GSM network. Other representative examples of smart cards for secure wireless communication networks include the Universal Identity Module (UIM), the Removable User Identity Module (R-UIM), and the UMTS Subscriber Identity Module (USIM). The SIM represents the subscription contract between a specific subscriber (network user) and the GSM network operator, i.e., providing the means for authenticating the subscriber for network access and identifying GSM network services to which the subscriber is entitled, i.e., the SIM card is the subscriber's identity in the context of the GSM network. The SIM card is portable to any GSM terminal, thereby providing the subscriber with an unprecedented degree of personal mobility.

The SIM card is in fact a small computer, containing a standardized operating system (JavaCard™ is implemented in the SIM card; Smart Card for Windows and Multos™ are other standardized operating systems for smart cards) and system files, RAM and flash memory (for storage of data and applications), a microprocessor, and typically a cryptographic co-processor. The GSM network operator controls the distribution and the stored content, e.g., data, applications, of the SIM card. Content on the SIM card may be provisioned by one or more of the network operator, the handset manufacturer, the SIM card manufacturer, or the subscribers themselves. Stored on SIM cards configured for GSM networks are subscription and security-related data, e.g., a subscriber number (International Mobile Subscriber Identity (IMSI)) that uniquely identifies the subscriber, a network operator-assigned subscriber-specific call number (MSISDN), i.e., the subscriber's 'phone number' in the GSM network, the subscriber key and cryptographic algorithms for authentication of the subscriber and encryption of subscriber communications (specified by the GSM network operator), and subscriber personal data, e.g., the subscriber's password or personal identity number (PIN) for accessing the SIM card, personal telephone directory, call charging information, a log of recently-dialed numbers, short text messages (for use with SMS (Short Message Service)), and a personalized subscriber services portfolio, i.e., applications.

Also embedded in the SIM card is a SIM Application Toolkit (STK). The STK provides the functional capability, inter alia, to allow the subscriber to access and use embedded applications via the user interface of the GSM terminal, and to modify the menu structure of the GSM terminal in conjunction with the use of such applications. The STK also allows the GSM network operator to download new data and/or applications to the SIM card to implement new services for the subscriber.

The zone provisioning and monitoring application may be stored in any combination of one or more of the SIM, R-UIM, USIM, internal memory, removable memory card, additional processors and/or a smart card inserted in the handset. For example, the zone provisioning and monitoring application could be a SIM Toolkit Java Card applet that is also stored on the SIM card. The zone provisioning and monitoring application may execute in any combination of the processor, the SIM, USIM or R-UIM on the handset, an additional processor, internal memory, and/or a smart card inserted in the handset.

Because different mobile radio terminals may have different capabilities, the zone provisioning and monitoring application may determine which type or types of zone definition are appropriate for each subscriber's terminal by performing capability tests on the terminal. These capability tests could determine that radio terminal's operating capabilities, e.g., video display size, memory size, processor speed, network capabilities (GSM, CDMA, and or Wi-Fi), as well as the terminal's capability to measure NMRs and/or CellID. These tests may be performed when the application is first activated (e.g., installed for the first time on a Symbian enabled handset), when the terminal is changed (e.g., in a SIM based application), and/or if the server 30 sends a message to the terminal directing it to perform the tests, or combinations thereof. This capability data could be used, for example to provision only 2G compatible zone profiles to 2G terminals, or may provision 3G zone profiles to dual mode 2G/3G compatible terminals where there is 3G network coverage. Additionally, the system may provision Wi-Fi zone profiles for Wi-Fi capable terminals. However, in cases of Wi-Fi zone profiles, there may be a issues due to Wi-Fi network changeability. This may be addressed by having dual mode (e.g., Wi-Fi and 2G cellular capable) devices periodically report measurements from both networks so that the terminal can correlate the Wi-Fi measurements with cellular network measurements. Attributes of a subscriber's terminal can be taken into account in choosing associations between zones and subscribers.

Accordingly, the zone profiles may be stored in any combination of the SIM, R-UIM, USIM, internal memory, removable memory card, additional processors and/or a smart card inserted in the handset. For example, the zone profiles may be stored on a Java Card based SIM card in zone definition slots.

The server 30 may be, for example a GNU/Linux or Apache server running on a blade server or server farm. The server 30 may also be a distributed network of servers. The server 30 is not limited to the physical hardware, but may also include the software. The server 30 may use any suitable database for storing the zone profiles. For example, the server 30 may store the zone profiles in one or a combination of a MySQL, MS SQL Server, MS Access, Oracle DB, and/or Apache Derby database.

The server 30 may be connected to the radio communications network 10 or coupled to an external IP network such as an IPv6 network, that may be connected to the radio communications network via, for example, a GSM Gateway GPRS Support Node (GGSN) or a CDMA2000 Packet Data Serving Node (PDSN). The server may also share processing responsibilities with an external processor 40. The external processor may be any type of computing platform such as another server, a mainframe, or a distributed computing network.

The server 30 may communicate with the mobile radio terminal 20 using any radio network data service such as SMS, USSD, GPRS, or HRPD. For security purposes, messages may be encrypted and/or authenticated using an encryption layer such as, for example, SSL, or TLS. While TLS typically only provides for server authentication, in some embodiments, mutual authentication of both the server 30 and the mobile terminal 20 may be desired. In these embodiments, public or private key infrastructure (PKI) deployments may be utilized incorporating one or more of, for example, RSA, Diffie-Hellman, and/or DSA encryption algorithms. Advantageously, encryption and mutual authentication may provide security against security violations such as spoofing or man-in-the-middle attacks.

Once the zone profiles are stored on the mobile radio terminal, the stored zone profiles may be periodically updated and managed by the mobile radio terminal 20, and/or the zone server 30. In certain applications it may be desirable to monitor the different memory capacities of the subscriber's terminal. In some applications this can be done when the mobile terminal reports the available zone slots in the initial handshake with the server, for example, it may be encoded in a "New applet" message.

One potential constraint in certain applications, is the mobile terminal memory capacity for storing zone profiles. While different terminals may have differing amounts of memory available, in many cases this will be insufficient to store all the zones that could potentially be associated with a subscriber. Embodiments of the present inventions enable these differing resource levels to be managed by tracking for each subscriber the available space for the zone profiles. However, a management issue may arise in certain applications when there are more zones associated with a particular subscriber than there is space available. Take for example a mobile advertising scenario in which a subscriber is a registered customer of a retail chain having more than 500 stores nationwide. Assume that the retailer wishes to detect (with the customer's consent), when the customer approaches any one of its stores in order to potentially transmit a coupon or other message to personalize the shopping experience for the customer. In this case to simply associate the subscriber with zones representing the stores could require more than 500 zones to be installed on the subscriber's terminal for monitoring which is likely to exceed the capacity available for certain terminals. Several memory management schema may be used to address this issue. In certain embodiments, the memory management may comprise one or more of a hierarchical scheme for dynamically managing the profiles, a selection and prioritization scheme for choosing profiles, and/or dynamic memory cache management.

In situations where there are more zones assigned to a subscriber than there is space available on the subscriber's mobile radio terminal, a subset of zones are made available to a subscriber at any given time or time period, this subset being managed by the system. In some cases the entire set of zones may be geographically dispersed. In these cases, the available memory slots on the mobile radio terminal may be operated as a cache, the elements of the cache being populated with profiles defining the zones that are geographically determined to be closest to the current location of the terminal. The location information used to order the zones in terms of proximity could be derived from any combination of recent updates from the terminal (zone entry/exit alerts) or periodic polling or other location related events within the wireless network, such as location update events. In other embodiments the cache management may employ a hierarchical technique.

Figure 3:
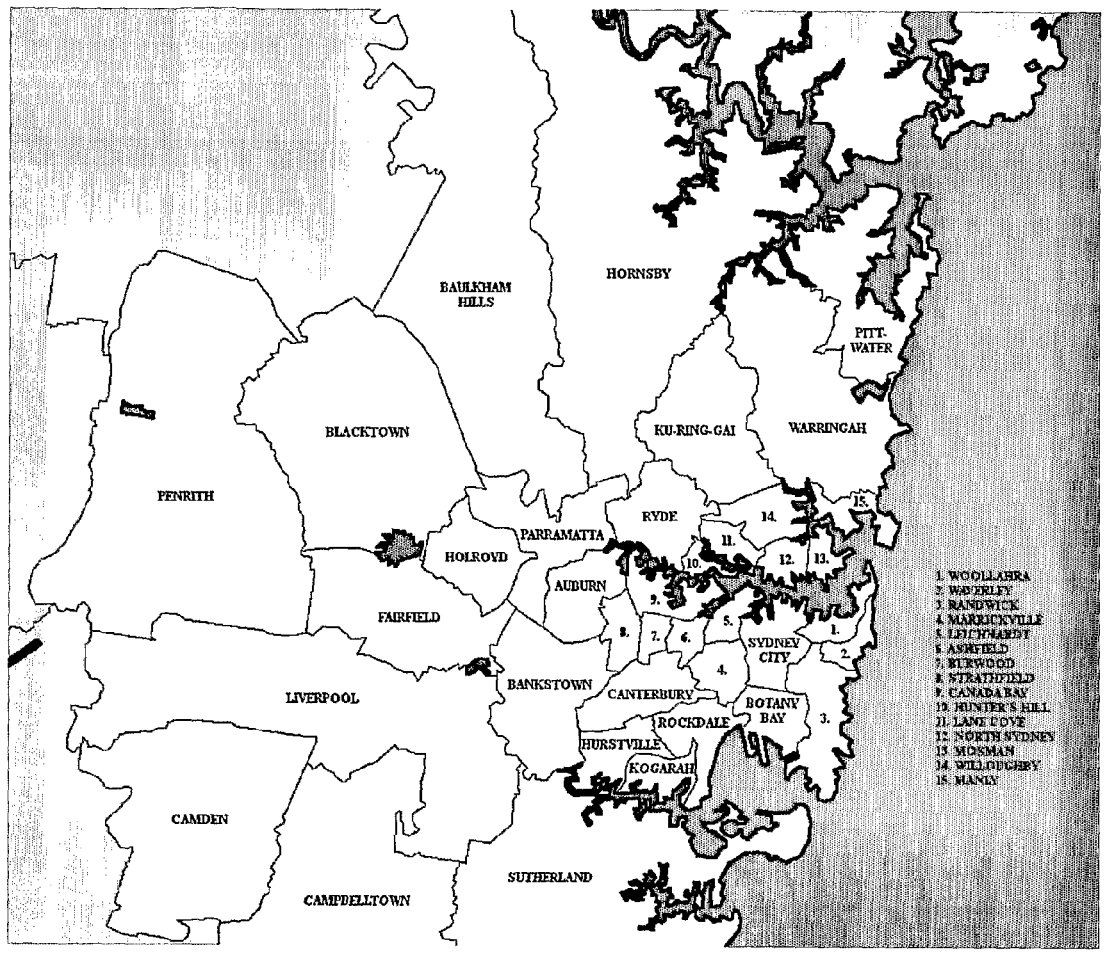
FIG. 3 illustrates an exemplary geographic location in accordance with certain embodiments.

In certain embodiments, such a hierarchical technique may involve periodically provisioning a mobile radio terminal with the zone profiles that are geographically determined to be the closest to the current location of the terminal. This could partially be supported by periodic polling of the mobile radio terminal's location. For example, the metropolitan area of Sydney, Australia is divided into 38 Local Government Areas (LGA) as illustrated in FIG. 3. In an exemplary embodiment, a zone could be defined for each LGA. Therefore, the mobile radio terminal could be provisioned with the LGA currently occupied by the mobile radio terminal and the adjacent LGAs. Thus if the mobile radio terminal is currently located in Waverley, the mobile radio terminal 20 may be provisioned with zone profiles corresponding to Waverley, Woollahra, and Randwick.

Figure 4:
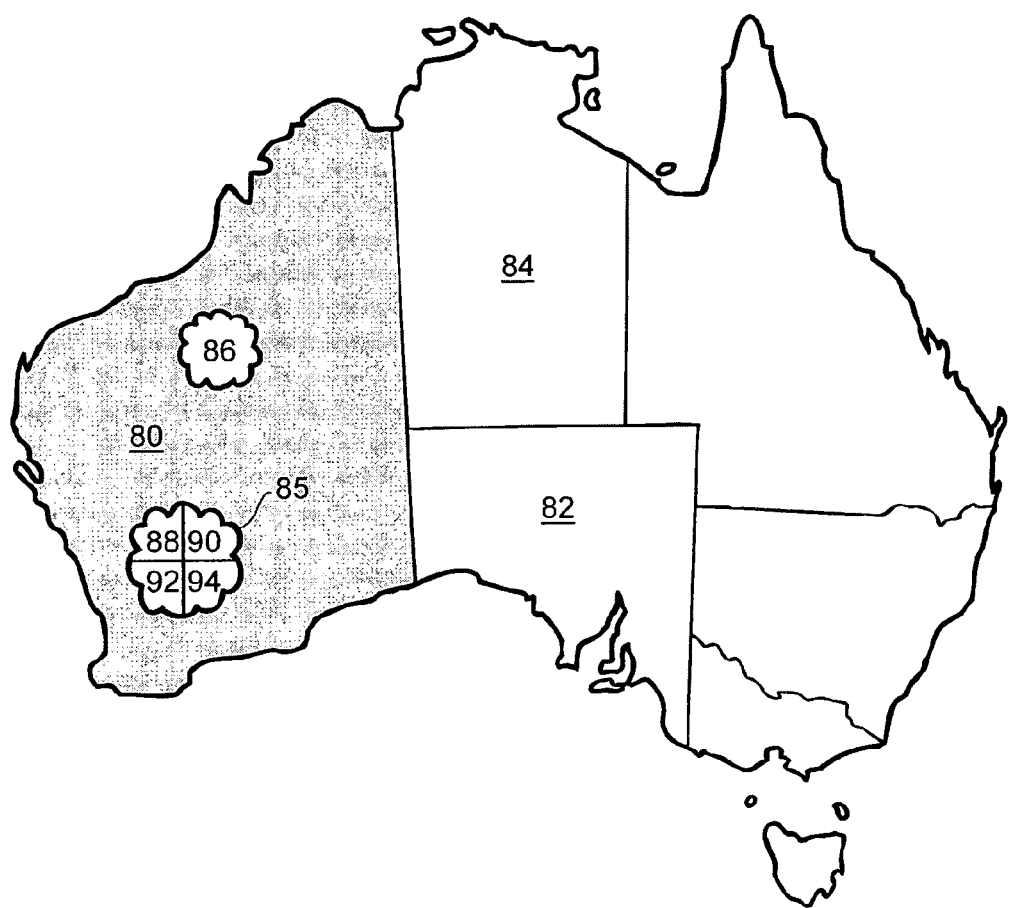
FIG. 4 illustrates an example of a hierarchical zone structure in accordance with certain embodiments.

In another embodiment, the hierarchical technique may utilize a hierarchical set of layered zones as shown in FIG. 4. As illustrated, a mobile radio terminal 20 could be provisioned with large scale zones 80, 82 and 84 corresponding to the current state or province and the adjacent states or provinces, and mid-scale zones 85 and 86 corresponding to cities within the current state or province. When a mid-scale zone corresponding to a city is triggered, all the large-scale and mid-scale zones except for the current one may be removed, and the terminal may be provisioned with small-scale zones 88, 90, 92, and 94 (for example representing neighborhoods within the city) that are contained within the current mid-scale zone. When a mobile radio terminal 20 leaves a mid-scale zone, the small-scale zones can be replaced with the current and adjacent mid-scale zones, in addition to the current and adjacent large scale zones. When a mobile terminal moves from one large scale zone to another, the large scale zones that are no longer adjacent may be removed and the current adjacent large scale zones, in addition to the mid-scale zones within the current large-scale zone may be added.

Such a hierarchy technique can be repeated down to an arbitrary level of geographic detail and could contain any suitable number of layers. For example, the above describes the hierarchy in terms of three layers: state→city→city region. Embodiments disclosed herein may also manage other variations of layers, for example, state, city, city region, city sub-region, particular shopping area, shopping mall, and so forth. The systems disclosed herein are capable of managing various sets of defined zones and stacking or constructing them based on a number of criteria, for example, but not limited to geography, time of day, certain days of the year, certain period of days in a year, zones that are to be given higher priority or lower priority, or combinations thereof. The number of layers actually in use can be varied dynamically, and the optimal will be a function of the number of slots available and the geographical distribution of zones. Advantageously, the radio telecommunications network lends itself to some layers e.g., country→network→region (LAC)→areas (groups of CellIDs). The layering strategy per subscriber can be continually updated whenever there is a change to the zones, for example layers may be added, removed, and/or purged when they've already been triggered.

For illustrative purposes and referring to FIG. 3, consider a subscriber traveling across Australia who is currently located in the state of New South Wales. While the subscriber is between major metropolitan areas, the subscriber's mobile radio terminal could be provisioned with a countrywide zone profile corresponding to Australia, large-scale zone profiles corresponding to New South Wales, Victoria, Queensland, and South Australia, and metropolitan area zone profiles corresponding to the cities of Canberra and Sydney. When the subscriber enters the large-scale zone corresponding to metropolitan Sydney, for example entering the Penrith LGA, the mobile radio terminal 20 transmits a message to notify the server 30. This message may contain any suitable data, such as the current radio parameter signal measurements taken by the mobile radio terminal and a notification that the mobile terminal 20 has entered the Sydney zone. The server 30 responds to this notification by provisioning the mobile radio terminal with mid-scale zone profiles corresponding to Penrith, Blacktown, Fairfield, and Liverpool, and with small-scale zone profiles corresponding to small regions within Penrith. These small-scale zone profiles could correspond to neighborhoods and/or could be used to advertise businesses, schools, or churches. The small-scale zones could also be used for any other suitable purpose. Additionally, the zone profiles corresponding to Victoria, Queensland, South Australia, and Canberra could be removed from the mobile terminal's memory.

Advantageously, such a hierarchical technique would maximize the number of zones stored on the phone that are likely to be triggered while simultaneously minimizing the network traffic associated with changing zones (i.e., churn).

To illustrate the use of the hierarchical zones in certain systems and methods, consider a situation in which a subscriber is associated with defined zones within Sydney & Melbourne in Australia as well as in Auckland, New Zealand. Further, assume that the subscriber is initially situated in Auckland but has just traveled to Australia, landing in Sydney. Assume that the subscriber's terminal has a capacity of 8 slots.

The complete set of zones associated with the subscriber are listed below in Table 3:

TABLE 3

| | Zone |
|---|---|
| 1 | New Zealand |
| 2 | Auckland |
| 3 | Company office 1 (Auckland CBD) |
| 4 | Company office 2 (in Auckland North shore) |
| 5 | Queen St Mall (Auckland CBD) |
| 6 | Parnell club (Auckland) |
| 7 | Auckland airport frequent flyer |
| 8 | Australia |
| 9 | Sydney |
| 10 | Company office1 (Martin place, Sydney) |
| 11 | Company office 2 (Circular Quay, Sydney) |
| 12 | Virgin Megastore, (Pitt St. Sydney) |
| 13 | Virgin, (Margaret St. Sydney) |
| 14 | Myer, (CBD, Sydney) |
| 15 | Myer, (Parramatta, Sydney) |
| 16 | Home (Baulkham Hills) |
| 17 | Parramatta Eels Rugby Club (Parramatta) |
| 18 | Sydney CBD & Eastern Suburbs |
| 19 | Sydney Western Suburbs |
| 20 | Myer, (Macquarie Centre, Sydney) |
| 21 | Sydney international airport frequent flyer |
| 22 | Melbourne |
| 23 | Myer Melbourne |

TABLE 3-continued

| | Zone |
|---|---|
| 24 | Myer Dandenong (Melbourne) |
| 25 | Virgin Megastore, (Chapel St. Melb) |
| 26 | Virgin Megastore, (Knox City. Melb) |
| 27 | Melbourne airport frequent flyer |
| 28 | Sydney Domestic airport frequent flyer |

The configuration of the zone slots and their associated status on leaving Auckland was as shown below in Table 4:

TABLE 4

| Zone Slot | Zone Profile | Zone Status |
|---|---|---|
| 1 | New Zealand | IN |
| 2 | Auckland | IN |
| 3 | Company Office 1 | OUT |
| 4 | Company Office 2 | OUT |
| 5 | Queen St. Mall | OUT |
| 6 | Parnell Club | OUT |
| 7 | Auckland airport frequent flyer zone | IN |
| 8 | Vacant | Vacant |

Once the subscriber powers on the terminal in Sydney, the application refreshes the zone status and then transmits a zone exit alert for a change in zone status for the Auckland & New Zealand zones. The new status of the installed zones is shown in Table 5 below:

TABLE 5

| Zone slot | Zone profile | Zone Status |
|---|---|---|
| 1 | New Zealand | OUT |
| 2 | Auckland | OUT |
| 3 | Company office1 | OUT |
| 4 | Company office 2 | OUT |
| 5 | Queen St Mall | OUT |
| 6 | Parnell club | OUT |
| 7 | Auckland airport frequent flyer | OUT |
| 8 | VACANT | VACANT |

This alert triggers a re-evaluation at the server of the installed zones on the terminal. The zone status changes themselves do not convey sufficiently precise location information, so the server first invokes a location calculation using the radio measurements which were included in the status update alert, and obtains a position estimate corresponding to a location within Sydney International airport. Based on this location estimate, the zone server transmits an entirely new set of zones to the terminal for monitoring. On receipt of these zone profiles, the application at the mobile terminal re-evaluates the zone status and transmits a zone status update to the server. The updated zone configuration is shown in Table 6 below:

TABLE 6

| Zone slot | Zone profile | Zone Status |
|---|---|---|
| 1 | Australia | IN |
| 2 | Sydney | IN |
| 3 | Sydney CBD & Eastern Suburbs | IN |
| 4 | Company office 1 (Martin place) | OUT |
| 5 | Company office 2 (Circular Quay) | OUT |
| 6 | Virgin Megastore, Pitt St | OUT |

TABLE 6-continued

| Zone slot | Zone profile | Zone Status |
| --- | --- | --- |
| 7 | Myer, CBD | OUT |
| 8 | Sydney international airport frequent flyer | IN |

Now assume that the subscriber leaves the airport and drives to his home in Baulkham Hills. Shortly after leaving the airport, the terminal sends a zone status change alert to the server conveying a zone exit event for the Sydney International terminal zone. This triggers the server to re-evaluate the zone priorities. In this case however there are no other zones in the immediate vicinity which need to be added so no change is made.

Some 20 minutes later as the subscriber continues on his way, the terminal transmits another zone status change alert to the server, this time indicating an exit from the Sydney CBD & Eastern Suburbs zone. This triggers a re-evaluation process in the server which this time does trigger a change in the zone, resulting in the updated configuration shown below in Table 7. Shortly after the updates have been made to the profiles installed on the terminal, the terminal issues a zone status update with the zone status values shown below. Because the terminal is in essentially the same location as when the changes were made, no further changes are applied.

TABLE 7

| Zone slot | Zone profile | Zone Status |
| --- | --- | --- |
| 1 | Australia | IN |
| 2 | Sydney | IN |
| 3 | Sydney CBD & Eastern Suburbs | OUT |
| 4 | Sydney Western Suburbs | IN |
| 5 | Home (Baulkham Hills) | OUT |
| 6 | Parramatta Eels Rugby Club (Parramatta) | OUT |
| 7 | Myer, (Parramatta, Sydney) | OUT |
| 8 | Virgin Megastore, Pitt St | OUT |

The preceding example illustrates one possible sequence of changes. Various alternative sequences could arise for the same pattern of subscriber movement depending on the relative priorities assigned to the different zones. Additionally it could be possible to operate the service in this case without the country and city level zones, instead using regional zones at the level of the Sydney East/West zones. The optimal layering strategy will depend on a variety of factors as disclosed herein.

In some embodiments, the zone profiles stored on the radio terminal may be managed by prioritizing the zones and then provisioning the terminal with only the certain priority zones. The priority assigned to the zones may be reviewed at certain intervals and, if any priority changes have occurred, the zone profiles stored on the terminal may be updated. The prioritization process may take a variety of inputs. For example, the process may include attributes associated with each zone and/or attributes associated with a particular subscriber to obtain a single priority value which can be used to ranking relative to other zones.

In applications directed to mobile advertising, one attribute may be a priority defined by the ad server 50. This may reflect different levels of service offered by the advertising service provided, charged at different rates. In this case, a zone definition associated with a premium rate advertising package would typically be installed on a subscriber's terminal in preference to an ordinary rate zone definition.

Another component of the overall priority for a zone may be based on time parameters associated with the zone. For example a zone that does not have a particular validity period would not receive any additional prioritization in this aspect, whereas a zone which had a validity period of two hours on a particular day would receive a large priority contribution as that time approached and a negative contribution after the validity period had passed.

Another component of the overall priority could be the alignment between any expressed preferences for classes of offers by the user and the classification assigned to the zone by the ad server. In the absence of any preferences indicated by the user, there would be no contribution to the overall priority from this aspect.

Another component of the prioritization for a given zone could be the current location of the subscriber in relation to that zone, the closer the estimated location of the subscriber is to the zone, the greater the location related priority adjustment that is applied. To enable a fair basis for comparison in different environments and zone types, the calculation for this priority component may include a normalization step in which the estimated current range between subscriber and zone is divided by the size of the corresponding zones.

In certain embodiments, the criteria for prioritizing the zones stored on the subscriber's terminal may be re-evaluated periodically by the system. This processing is triggered from time to time by one of the following events: a timer expiry (measuring the time since the processing was last carried out); a zone state event (terminal has alerted the server on leaving or entering a zone); new zone added (for instance the ad server has established a new association between this subscriber and one or more new zones); zone deleted or disabled (ad server has removed an association); the time window associated with a zone currently associated with this subscriber has either activated or expired (e.g.: a time limited zone definition covering say 2 hours around lunch time, has just expired), or combinations thereof.

One trigger for a re-evaluation of the zone priorities may be when the mobile terminal 20 notifies (i.e., alerts) the zone server 30 of a zone status change. For example, if a zone has been defined for a single use by any given subscriber, then a zone status change would cause the corresponding zone to be marked as inactive and discarded from the subscriber's terminal. In other cases where a zone has been configured for a specified number of detections, if that number has been reached, the zone definition may be removed from the subscriber's terminal and any association between the subscriber and the corresponding zone on the zone server 30 could be canceled. In yet other cases, if a zone has been configured for repeated activation at set time intervals (e.g., an advertisement in a particular location set to trigger an advertisement once per month) then on receiving an in-zone notification from the terminal, the zone server may remove the zone definition from the mobile terminal. In these cases, the zone server 30 may also disable any association between the subscriber and the corresponding zone, until the interval elapses at which time the association will be re-enabled.

A further action on receipt of a zone change notification from the mobile application may be to update the current location data of the terminal on the server using the information in the alert. Note that this information may be one or a combination of the zone location status, the radio signal measurements taken by the terminal, and/or a location estimated component from the radio measurements. The priorities can then be re-evaluated taking into account the updated location and any resulting changes in the prioritized list can be applied to the set of zones stored on the mobile terminal.

A re-evaluation may also be triggered by a power cycle on the terminal, at which time the mobile terminal refreshes the status of all active zones being monitored in a message to the zone server. Another trigger may be a periodic poll of the mobile terminal 20 by the zone server 30. In some cases the system of this invention could use a combination of hierarchical layered zones as described above and selective polling. The polling period could be configured as a default either across all subscribers or per subscriber. Alternatively, the period could be adapted according to the location of the subscriber. For example, if the updated location of the subscriber is estimated to be in a suburban locale where no zone definitions are active, then the polling interval could be increased because the user is unlikely to enter any target zones in the near term. However, if the most recent poll indicated that the subscriber was in a dense city location where there were many zones associated with the subscriber active then the poll interval would be decreased for more frequent updates. In the case of adaptive polling rates, the polling could also be slowed or even halted during a period such as nighttime if none of the zones related to offers that were relevant at night. In addition to adjusting the polling rates based on subscriber location, the polling interval counter could automatically reset on receipt of any mobile triggered alerts.

Figure 5:
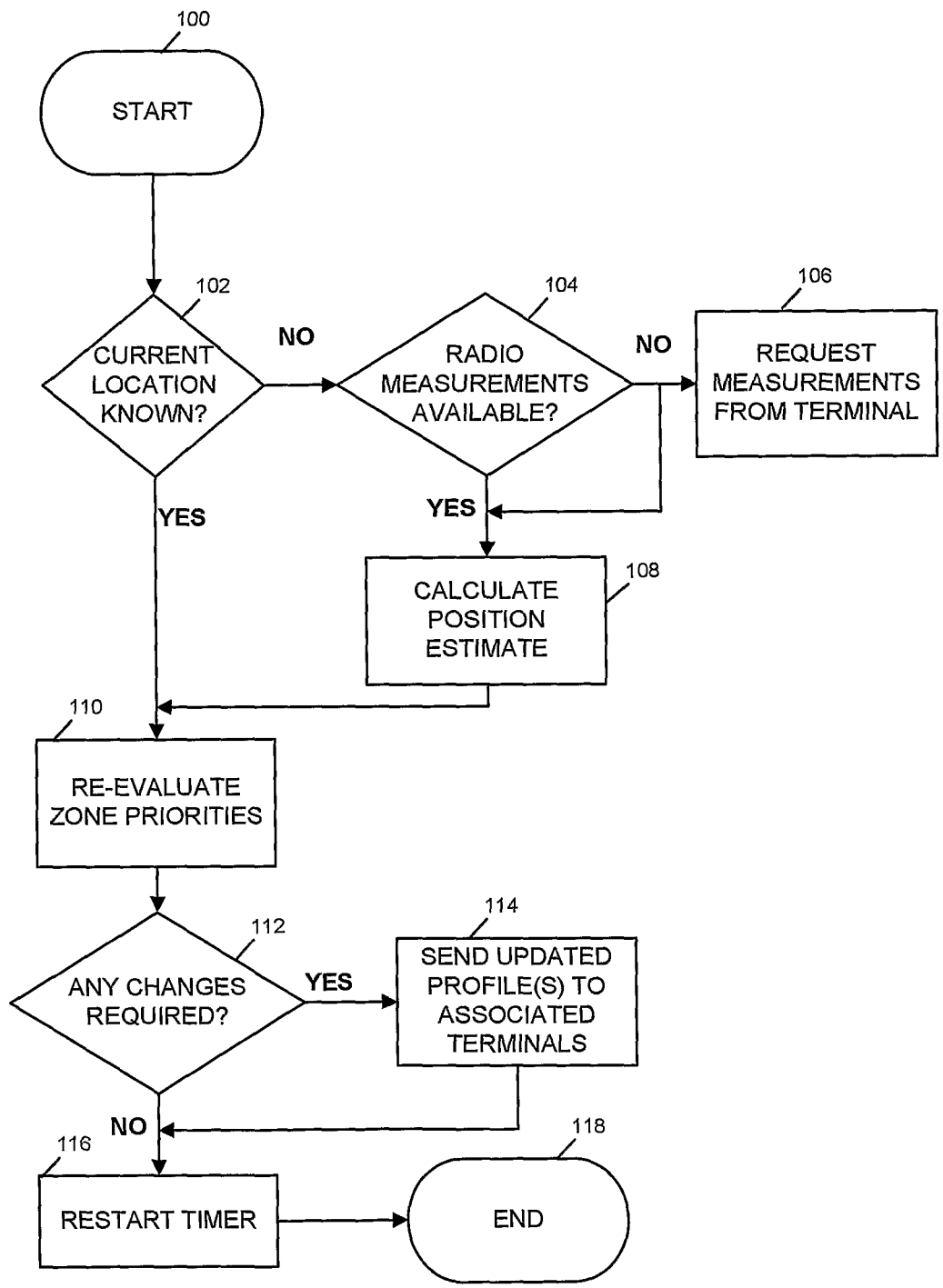
FIG. 5 illustrates an exemplary flowchart of the processing carried out to maintain the set of zones being monitored by each subscriber's terminal in accordance with certain embodiments.

FIG. 5 illustrates the processing carried out to maintain the set of zones being monitored by each subscriber's terminal. The process starts at step 100 and periodically checks whether the current location of the subscriber is known to sufficient level of precision at step 102. This would be the case if; for instance, the event which triggered the processing was a zone entry notification from the terminal for a zone with a small geographical extent. On the other hand if the event was a timer expiry then the server may not have up to date information on the location of the subscriber. This check may be performed at intervals defined by a timer.

If the current location is not known, then the server may check whether the radio measurements needed to compute a location estimate are available at step 104. This would be the case for instance if the event triggering the processing was a zone entry or exit alert for a coarse zone. In this case the zone change does not convey precise location information however the radio measurements that accompany a zone state change notification can be used to calculate a more accurate location estimate.

If no radio measurements are available, the server may poll the terminal to request the latest radio measurements collected by the mobile application at step 106. In certain cases where there are more zone slots available on a mobile radio terminal than there zones associated with that terminal, then terminal polling will be optional and may not be required. In certain cases where there are more zones associated with a terminal than there are zone slots available, but the zones associated with a terminal are geographically dispersed, terminal polling may also be optional and may not be necessary. However, in cases where there are more zones associated with a terminal than there are zone slots available, and the zones associated with a terminal are geographically concentrated, then the terminal may be polled.

Once the measurements are available, a location estimate is computed at step 108, optionally together with a location confidence estimate. Once a position estimate is available, the priorities associated with all the current active zones for this subscriber are reevaluated at step 110 to determine the optimal set to be deployed on the subscriber's terminal for monitoring.

If there are any changes required for the current set of zones at step 112 that are being monitored, the server will push one or more zone profiles to the terminal at step 114.

The final step 116 in the process is to restart the timer for the next evaluation and then the process ends at step 118. The interval for the timer is adjustable depending any suitable factors such as on one or more of the following:

1) The minimum refresh interval configured for this subscriber by the application;
2) The location of the subscriber (in densely populated areas the refresh rate will configured for more frequent updates than in sparsely populated areas where it takes longer to make a significant change in position);
3) The density of active zones for that subscriber in the area, for example, may increase the timer interval if there aren't any nearby zones that need to be provisioned in the terminal's zone cache;
4) Whether there are vacant slots on the terminal or not. If there are already vacant slots then there is probably little need to refresh the zones and this would be optional.

Based on these factors, the timer interval could be an interval, for example, of between about 1 second and about 60 minutes, between 10 seconds and 30 minutes, between 20 seconds and 15 minutes, between 30 seconds and 10 minutes, between 30 seconds and 5 minutes, or between 45 seconds and 5 minutes.

In certain embodiments, the system could also incorporate a dwell time criteria. For example, some or all of the zones on a mobile terminal could have timers associated with them that would start running when a mobile terminal entered the zone. These zones would not be triggered until the timer reached a certain value, thereby delaying activation of the zone. An alternative option is to incorporate the dwell time criteria into the zone detection filter or debouncer. This could be used to prevent triggering zones when a mobile terminal rapidly traversed an area, such as driving through in a car. In certain embodiments, the system could adaptively learn a mobile radio terminal's typical movements, e.g., the route a user traverses while traveling to and from work. In these cases, the system could suppress triggering any zones along this typical route. This could be useful, for example, to prevent sending the same advertisements to a user who travels the same route each morning.

Once a zone profile has been successfully provisioned on the mobile radio terminal 20, the mobile radio terminal 20 may commence monitoring to determine whether it is within the defined zone. The mobile radio terminal 20 may take measurements periodically. Alternatively, the mobile radio terminal may take measurements when triggered by a message from the server 30. In another embodiment, the mobile radio terminal may take measurements when triggered by a user action, such as initiating a call, or upon user command.

Once the mobile radio terminal 20 obtains the measurements, it may then use an algorithm to determine whether or not it is in the defined zone. In alternative embodiments, the algorithm may determine whether the mobile radio terminal is within a certain distance of the boundaries of the defined zone. For example, the algorithm may determine whether the mobile radio terminal is within about 10 m to 1000 m, 50 m to 500 m, 50 m to 100 m, 10 m to 50 m, or 25 m to 100 m of the defined zone. In one embodiment, the algorithm makes a decision as to whether the mobile is in or near the zone by calculating a cost, and comparing this cost with a threshold. The cost is a quantitative representation of the difference between the measurements and the zone profile, calculated using a cost or penalty function. For example, the total cost, C, is equal to $$C = C_m + C_{um} + C_{ur}$$

where
- $C_m$=Cost associated with cells that are observed and are matched in the profile
- $C_{um}$=Cost associated with cells that are observed but are not matched in the profile
- $C_{ur}$=Cost associated with cells that are in the profile but are not reported In this example, cells are uniquely renumbered such that cells 1 to $N_m$ are associated with cost $C_m$, cells $N_m+1$ to $N_m+N_{um}$ are associated with cost $C_{um}$, and $N_m+N_{um}+1$ to $N_m+N_{um}+N_{ur}$ are associated with $C_{ur}$, where

- $N_m$=Number of observations that are matched in the profile,
- $N_{um}$=Number of observations that are not matched in the profile,
- $N_{ur}$=Number of cells that are in the profile but are not reported, Each of the costs is then calculated in the following manner:

$$C_m = \sum_{i=1}^{N_m} \frac{(r_{p_i} - r_{o_i})^2}{2\sigma^2}$$

$$C_{um} = \sum_{i=N_m+1}^{N_m+N_{um}} \frac{(r_{p_i} - t_{um})^2}{2\sigma^2}$$

$$C_{ur} = -\sum_{i=N_m+N_{um}+1}^{N_m+N_{um}+N_{ur}} \left[\frac{1}{2}\left(1 + \operatorname{erf}\left(\frac{t_m - r_{p_i}}{\sqrt{2}\,\sigma}\right)\right)\right]$$

where
- $r_{pi}$—The expected value of the signal strength (dBm) of the ith cell, as entered into the profile,
- $r_{oi}$—The observed value the signal strength (dBm) of the ith cell,
- $t_{um}$=a fixed value (in dBm) that represents the value of signal strength such that it is unlikely that a cell will be not be observed in the profile if the cell's expected signal strength is above $t_{um}$,
- $t_m$=a fixed threshold (in dBm), as described in PCT/AU2006/000347.
- σ=scaling parameter, and
- erf=the standard error function.

The decision as to whether the mobile is in the zone is made as follows
   If C<χ2 (x, $N_T$−2) then in the zone;
   Else not in the zone.
where χ2 is the standard statistical function, $$N_T = N_m + N_{um} + N_{ur}$$

x=a percentage between 0 and 100, which represents the degree of consistency between the measurements and being in the zone. Any other suitable cost function may be used such as, for example, the cost function disclosed in PCT/AU2008/000344 entitled "Enhanced Zone Determination," which is incorporated herein by reference in its entirety.

In a GSM system, experimentation and simulations indicate that suitable values for the unmatched cost threshold lie between −80 dBm and −95 dBm or between −85 dBm and −100 dBm or between −90 dBm and −105 dBm. Similarly, suitable values for the percentage, depending on the application lie between 50 and 70 or between 65 and 85 or between 75 and 100 percent.

The value of σ may depend on several factors including the radio environment, and may range from about 3 dB to about 24 dB (e.g., about 3 dB-9 dB, 6 dB-15 dB, 9 dB-20 B or 13 dB-24 dB). One method of calculating the value of $t_{ur}$ is as described in PCT/AU2006/000347. In GSM, the signal strengths may be quantized to about 1 dB.

The mobile radio terminal may observe the signal levels, timing advance, time differences, or other parameters as described above. In addition, the fact that a particular cell is not reported may also be an observation. It should also be noted that a variety of approximations may be applied to reduce the computation load associated with these calculations especially in mobile terminals. Examples include a lookup table approximation to the error function and the Chi-Squared distribution. See PCT/AU2006/000478 for an example of the zone determination process.

The output from the immediate zone status determination at each cycle may be applied to a filter which is designed to suppress short term variations caused by brief re-selections. In some embodiments at least one filter threshold is used to smooth short-term fluctuations in the zone status. In other embodiments at least a plurality of filters is used to smooth short-term fluctuations in the zone status. This filter may be referred to as a debouncer, or an anti-hunting filter and may be implemented in a number of ways. For example, hysteresis could be used to filter the current zone status determination signal so that the output determination takes recent history into account. The filter could also take into account, for example, the difference between the immediate cycle cost and the log probability threshold.

The debouncer could be implemented, for example, in software as a feedback loop with a memory of past outputs. As each zone status determination is made, the memory could be updated correspondingly with the current determination. This memory would provide an input to the filter for subsequent determinations. This could operate as a moving window average, taking the costs computed in a series of cycles to compute an average cost before comparing the resulting average cost against a cost threshold to determine the status. The software could execute in any combination of the handset, the Subscriber Identification Module (SIM) that is inserted in the handset, an additional processor or smart card inserted into the handset. Alternatively, the debouncer could be implemented in hardware.

The mobile radio terminal 20 may transmit the results of its zone determination periodically to the server 30. In one embodiment, a notification message may be triggered by the mobile upon determining that it has moved into or out of a defined zone. Advantageously, transmitting the information only on a change of status yields low signaling rate which in turn minimizes battery drain in the subscriber's terminal. In another embodiment, this transmission may be initiated by a message from the server.

Other events may be used to trigger the transmission of the zone status message to the network. For example, the transmission could be triggered by the subscriber initiating a call, thereby sending the information when it is required to determine the zone status for rating a call. The act of unlocking the mobile terminal keypad by the subscriber might also be used as a suitable trigger for this transmission. Alternatively the transmission could also be triggered by the subscriber from a menu item on the terminal.

The issue of ambiguous measurements arises again during the zone detection process where a set of current measurements is compared against a zone profile, for example, when a mobile radio terminal 20 is situated within a zone and reports a measurement for the neighbor cell. As previously described, this measurement is in itself ambiguous. Although the ARFCN and BSIC reported match the ARFCN and BSIC of an entry in the zone profile, without knowing where the mobile radio terminal 20 is situated, it is not clear whether there is a match against the cell in the profile. It is only known that the measured parameters match some fields of an entry in the profile. In this case certain embodiments do not require an explicit ambiguity resolution of the kind that may be required when generating the profile. Instead, using at least one unambiguous match, reliance can be placed on the unambiguous match to constrain the location of the mobile radio terminal 20, sufficiently such that there can only be one candidate cell in that vicinity whose parameters match the entry in the profile.

While the present example shows the use of a cell ID to resolve the ambiguity, it will be understood that other methods are available. In GSM, for example, using the Location Area Code (LAC) rather than the cell ID would in many cases also enable the ambiguity to be resolved. Yet another possibility is to use the provisioning information to resolve the ambiguity for the zone definition measurements. In this case, a series of ambiguous measurements could be collected and the nominal location supplied by the user used to constrain the location of the mobile terminal and thereby resolve the ambiguity. In other networks, similar parameters can be used to resolve the ambiguity. In UMTS, the similar assignment of cell ID and LAC enables a similar mechanism as described for GSM.

When the server receives a zone status message from a mobile terminal, it may process the included measurements and re-evaluate the zone status change according to the methods described above. Advantageously this may provide independent server-side verification of the zone determination. This is also beneficial because the server may have access to additional information or algorithms not available at the mobile.

Embodiments disclosed could be suitable for a wide variety of applications. As examples, consider applications that greets frequent flyers when they arrive at an airport, that greets customer who is a frequent purchaser at a store or holds a credit card when they enter the store, that allows for mobile advertising, that triggers traffic reports when a mobile terminal enters a certain traffic area, that triggers a message when a radio terminal enters a restricted zone, that sends information that a child has left a school or home or gotten to school or home, that sends safety messages to registered users when there is an incident in a particular location, buddy finder systems, community message type services, and zone based mobile games.

One application would be delivering advertisements and other "push" based communications to mobile telephone subscribers, triggered based on their location. As an example, consider a music store that wished to transmit advertisements to all subscribers in the vicinity advertising a new release album, perhaps coinciding with an in-store appearance of the artist. The advertisement might include an inducement such as a time limited offer of a discount or a personally autographed edition for the first 100 purchasers. An alternative inducement might be to include a hyperlink to a site where a copy of the latest single from the album could be downloaded.

In addition to focusing the advertisements spatially, other criteria could be combined including age bracket, previous spending habits if the retailer has such information available based on customer loyalty programs etc. Many variations are possible, however, the advertisements typically will be directed only to those who are in the vicinity, and thereby likely to alter their behavior and respond to the communication. Research has shown that subscribers will not accept this type of unsolicited advertising to their mobile phones unless they consider offers relevant (i.e., nearby).

A technical challenge in operating this type of mobile advertising service is determining when subscribers are in the (typically small) regions where the advertisements are to be targeted. Another technical challenge is not polling the terminal so much that the system becomes unacceptable from a cost and/or network usage view point. Another technical challenge is not overusing the resources of the terminal or the network, for example using too much battery power from the terminal. To understand the technical challenge, consider that there would be in most cases, a requirement to monitor the location of candidate subscribers continually in order to not miss an opportunity to deliver an advertisement. This can be understood from the fact that a shopper on foot may walk past a target store and "out of range" within a few minutes. In this case, monitoring at intervals of 30 minutes would frequently miss opportunities for delivering an advertisement. Against this requirement for frequent monitoring, consider a network based location system that periodically opens a connection to each monitored subscriber's terminal to poll their location. To be effective, the polling interval preferably would have to be at sufficient intervals to locate the terminal in the zone(s) to be triggered. However, this type network based polling approach may be infeasible for several reasons. First, scaling the service to large numbers of subscribers would require very large network infrastructure capacity. Moreover, the attendant cost and consumption of network bandwidth would be prohibitive. Further, the battery impact on the subscriber's mobile terminal associated with repeated network polling would be unacceptable. These penalties are made all the more acute because the majority of polling cycles would yield no benefit to advertisers, merely confirming that the subscriber is not located anywhere near the target point(s) of interest. Embodiments disclosed herein overcome, or make, these problems more manageable.

For example, assume that a network-based zone location system and a system in accordance with embodiments of the present disclosure are both trying to deliver advertisements to the same zones (neglecting the fact that network based cannot actually achieve the same spatial precision). Further assume that in any given day the average user only visits 2 zones (i.e. there are two opportunities to deliver an advertisement per user per day). Assume further that the network based system needs to check the mobile radio terminal's location at least every 15 minutes, which requires one message from the network to the mobile radio terminal and another message from the mobile radio terminal to the network. Thus, for each subscriber a network-based system will require 96 messages at, for example, $0.05 per message. This means that for two advertisements, the total cost is $4.80 per day, or $2.40 for one advertisement. Additionally, the cost for platform capacity should be included. Assuming that a single node in the network manages 50 polls per second and costs $100,000, and that each subscriber would add a transaction rate of $(1/15*60)$ =0.0011 transaction per second, then the additional platform cost would be $2.22 per subscriber. In total, operating a network based polling system would cost about $7 per user per day, or assuming we deliver 2 ads a day, the cost per advertisement will be around $3.50.

By contrast, for embodiments of the present disclosure the transaction rate is 2 messages total per day (assuming the average user only enters 2 zones per day) for a total messaging cost of $0.10 per subscriber. Additionally, the platform capacity cost would be 2/(24×3600)/50*$100,000=$0.04. Therefore embodiments of the present disclosure may have a cost per advertisement of about $0.14. This represents a significant cost savings over network-based location systems.

Figure 6:
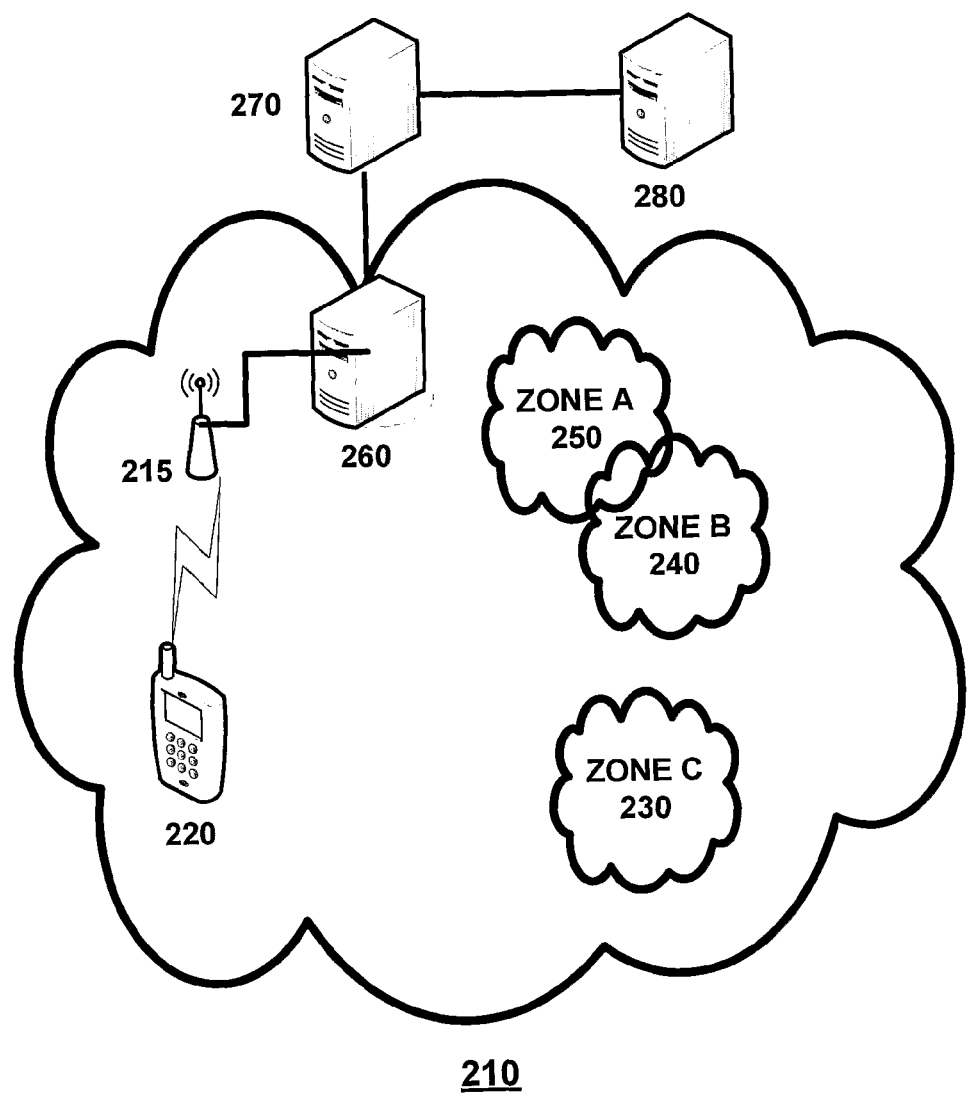
FIG. 6 illustrates an exemplary radio communications network with an advertising system in accordance with certain embodiments.

Referring to FIG. 6, a system for mobile advertising according to an exemplary embodiment of the invention includes one or more mobile radio terminals 220 in communication with the radio transceiver 215 of radio telecommunications network 210 having defined advertising zones A (230), B (240) and C (250), zone server 260, advertisement server 270, and optionally user profile database server 280. The user profile database server 280 may be incorporated in the ad server 270 or may be a separate server and may communicate with the advertisement server 270 and zone server 260 to provision advertisements to mobile terminals. The communications between the various servers may be established via any suitable communications network such as TCP/IP over Ethernet. Note that the servers need not be housed in the same premises. The zone server could be maintained within the network operator's secure environment whilst the advertising server could be hosted externally and managed by the advertising service provider.

Network 210 may be linked to and communicate with advertisement server 270 that can dynamically generate advertising messages, such as electronic coupons, to be transmitted to customers 10 in a targeted fashion. Advertising messages generated by server 270 are transmitted as packets of data in a format that mobile terminals 220 can receive and access, such as a short message service (SMS) message format or another message format which may be sent using the wireless application protocol (WAP) where mobile terminal 220 is a WAP-enabled mobile terminal. Server 270 may contain a current service utilization database that can serve as a central register that maintains records of the current advertisers and advertising messages that are being, or are scheduled to be, distributed. Moreover, server 270 typically contains any predetermined portions of the content of the advertising messages to be distributed. The advertisement server 270 may be for example a centralized entity, like the service provider of mobile network 220, an application service provider (ASP), an advertisement broker (which has several accounts), or the company that is placing the advertising through the company's private network. In alternative embodiments, rather than connecting an advertisement server 270 directly to mobile network 210, mobile network 210 may be linked to the Internet 290 and an advertisement server 270 may also be linked to the Internet 290. In still other embodiments, the advertisement server 270 may pre-provision advertisements on selected mobile terminals such that the ads may be triggered by the associated zone without requiring the advertisement to be transmitted.

Figure 7A:
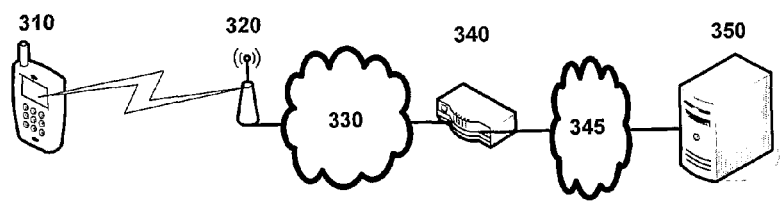
FIG. 7A to 7D illustrate a variety of configurations of an advertising system in accordance with certain embodiments.

FIGS. 7A to 7D illustrate various exemplary embodiments of systems in accordance with the present disclosure. FIG. 7A shows an exemplary configuration in which a mobile radio terminal 310 is in communication with a radio network transceiver 320. The radio network transceiver 320 is in turn coupled to a radio communications network 330 (e.g., a GSM network). In certain embodiments, the radio communications network 330 may have a gateway router 340 connected to an external IP network 345 that allows communication with an external server 350. In alternative embodiments, the external server 350 may be inside the radio communications network 330. In this exemplary configuration the external server 350 contains both a zone server and an advertising server as described above.

Figure 7B:
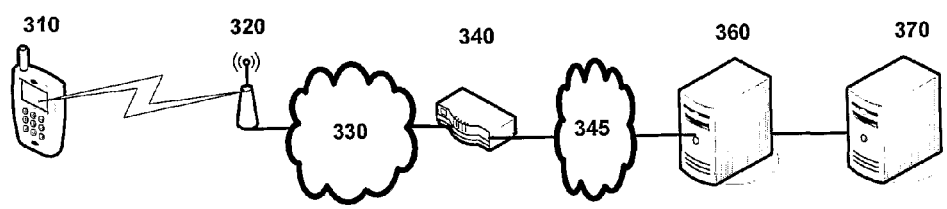

FIG. 7B shows another exemplary configuration in which a mobile radio terminal 310 is in communication with a radio network transceiver 320. The radio network transceiver 320 is in turn coupled to a radio communications network 330 (e.g., a GSM network). In certain embodiments, the radio communications network 330 may have a gateway router 340 connected to an external IP network 345 that allows communication with a zone server 360. In alternative embodiments, the zone server 360 may be inside the radio communications network 330. The zone server 360 is in communication with an advertising server 370 that may also be inside or outside the radio communications network 330. It should be noted that the advertising server 370 and zone server 360 need not be distinct physical devices but could be separate logical components of a software system, connected via an interface such as described above.

Figure 7C:
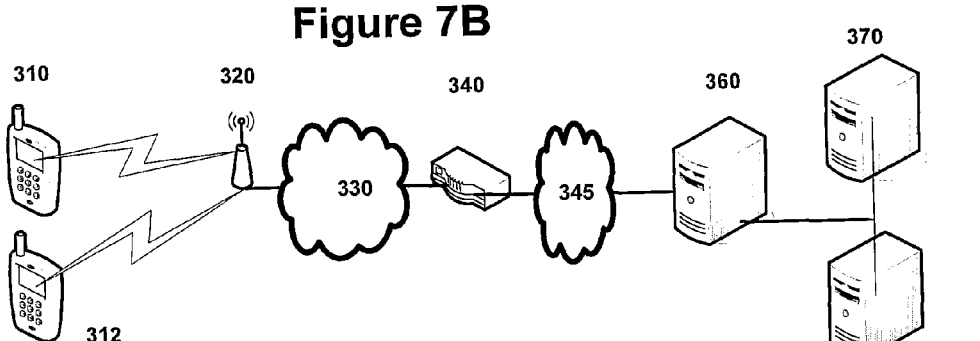

FIG. 7C shows another exemplary configuration in which two mobile radio terminals 310 and 312 are in communication with a radio network transceiver 320. The radio network transceiver 320 is in turn coupled to a radio communications network 330 (e.g., a GSM network). In certain embodiments, the radio communications network 330 may have a gateway router 340 connected to an external IP network 345 that allows communication with a zone server 360. In alternative embodiments, the zone server 360 may be inside the radio communications network 330. The zone server 360 is in communication with a first and second advertising server 370 and 372 that may also be inside or outside the radio communications network 330. The first advertising server 370 and the second advertising server 372 may be operated by the same organization (e.g., advertising agency) or may be operated by different organizations.

Figure 7D:
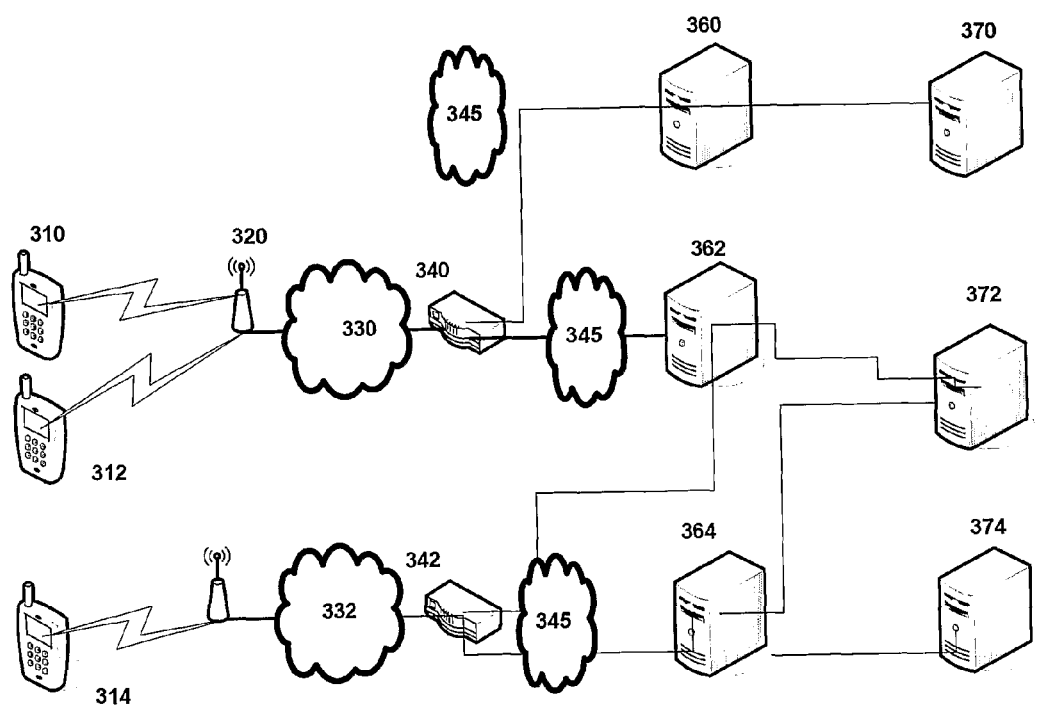

FIG. 7D shows another exemplary configuration in which mobile radio terminals 310, and 312 are in communication with a radio network transceiver 320 coupled to a radio communications network 330 (e.g., a GSM network). Another mobile radio terminal 314 is in communication with another radio network transceiver coupled to another radio communications network 332 (e.g., a CDMA network). In certain embodiments, the radio communications networks 330 and 332 may have gateway routers 340 and 342 connected to an external IP network 345. As illustrated, the gateway router 340 may allow communication with zone servers 360 and 362. The gateway router 342 may allow communication with zone servers 362 and 364. Further, the first zone server 360 is in communication with the first advertising server 370, the second zone server 362 is in communication with the second advertising server 372, and the third zone server 364 is in communication with the second and third advertising servers 372 and 374. In alternative embodiments, one or more of the zone servers 360, 362, and 364 and/or advertising servers 370, 372, and 374 may be inside the radio communications network 330. The first, second, and third advertising servers 370, 372, and 374 may be operated by the same organization (e.g., advertising agency) or may be operated by different organizations.

Using the systems illustrated in FIGS. 6 and 7A to 7D, it is possible for a broker to offer advertisers (e.g., commercial business users) dynamically generated advertisements to be distributed to mobile terminal users, who match the criteria set by advertisers. There could actually be several competing brokers, each linked to the network through its own advertisement server and offering the electronic coupon distribution services to advertisers.

Advertisers could register with an advertising database to be allowed to purchase mobile advertisements. Registration could involve, for example, a web-based interface that would allow retailers to log in and buy one or more zones, and/or use their own mobile radio terminals to define zones. Advertisements could be sold for pre-defined zones in common high traffic locations, i.e. malls, train stations, bus stops, community areas, or airport lounges. Additionally, advertisers could buy a certain number of mobile subscribers to whom the zones would be distributed. There might be additional parameters enabling them to specify the demographics of the subscribers they are interested in targeting.

Figure 8:
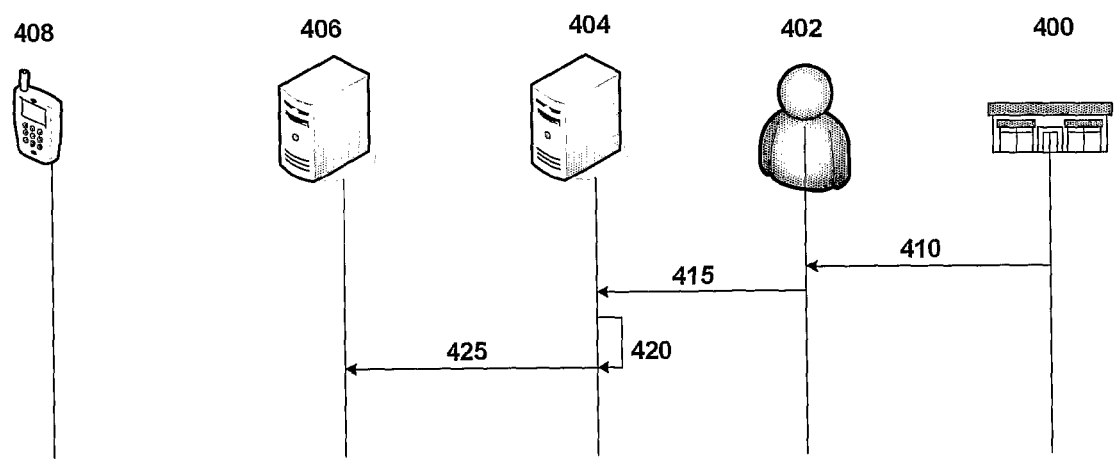
FIG. 8 illustrates an exemplary diagram of the process for generating an advertising zone in accordance with certain embodiments.
Figure 9:
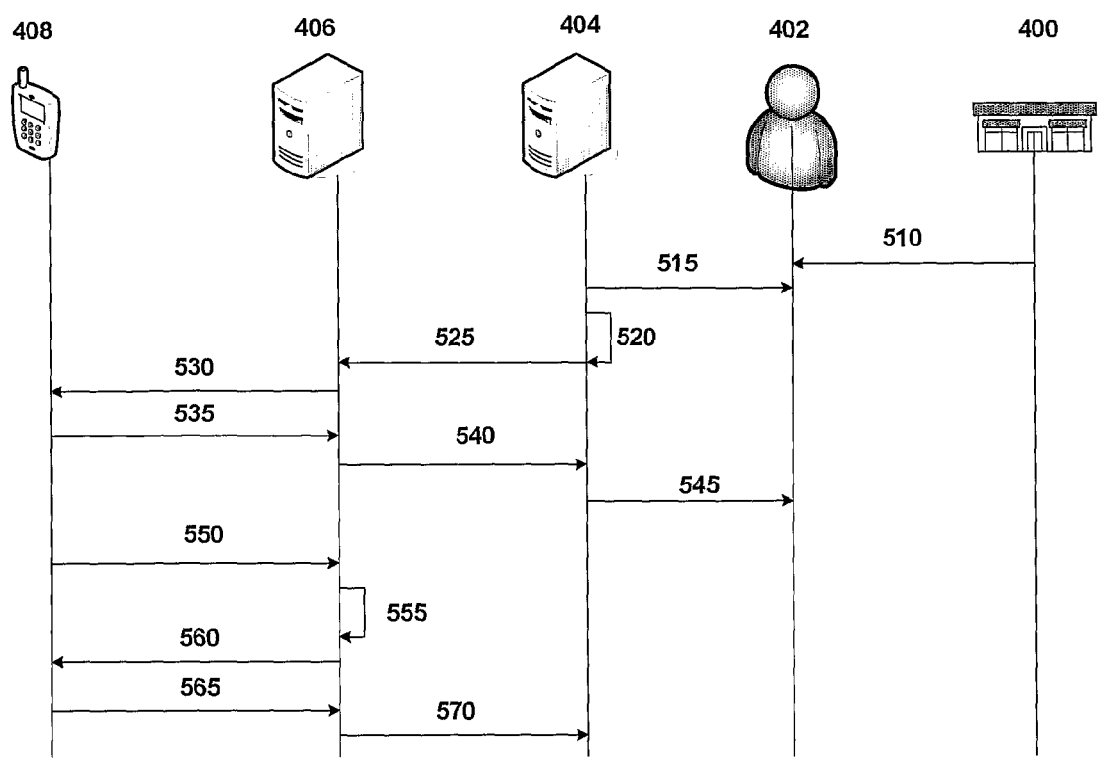
FIG. 9 illustrates an exemplary diagram of the process for generating an advertising zone in accordance with certain embodiments.
Figure 10:
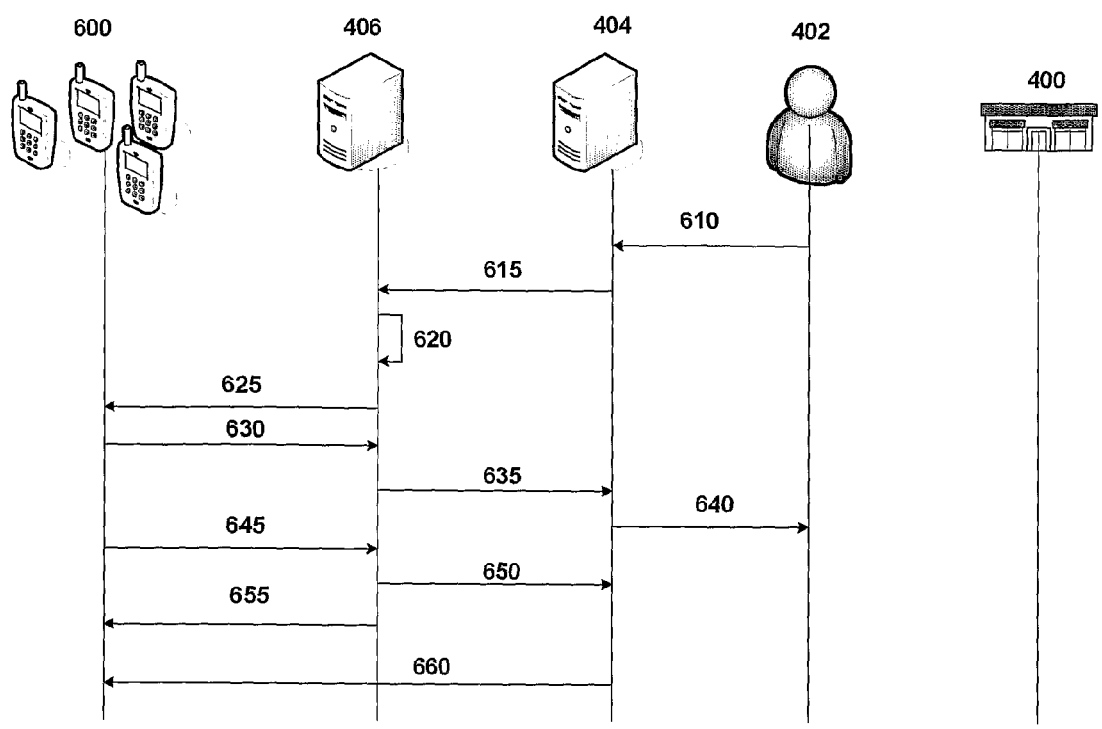
FIG. 10 illustrates an exemplary diagram of the process for provisioning and monitoring a zone in a mobile radio terminal in accordance with certain embodiments.

An exemplary flow diagram of a typical zone defined for use by a retailer to deliver advertisements to customers is shown in FIGS. 8 to 10. FIG. 8 illustrates an embodiment in which the zone is to be defined using purely predicted parameters (i.e., radio signal propagation modeling). Initially, a retailer 400 contacts the advertising service provider 402 by, for example, sending an e-mail or SMS or registering on a web portal (step 410). The advertising service provider 402 communicates with the ad server 404 (step 415), which provisions a zone for the service and assigns a unique identifier (step 420). The ad server 404 may be located on an internal network of the advertising service provider 402 or may be hosted by another entity. The ad server 404 then transmits a request to the zone server 406 to provision a corresponding zone (step 425). The request to the zone server 406 includes relevant parameters such as the zone location, the desired zone size, the dwell time required for a detection, the radio networks on which the zone is to be defined, the type of radio parameters measurements which should be used in monitoring the zone (i.e. NMR or CID or CID+RSSI or WIFI etc.). The zone server 406 may then complete the zone profile definition and provision the zone profile on the associated mobile radio terminals 408 as described below.

FIG. 9 illustrates an embodiment in which the zone is to be defined by measurements collected in the zone. Initially, a retailer 400 contacts the advertising service provider 402 by, for example, sending an e-mail or SMS or registering on a web portal (step 510). The advertising service provider 402 communicates with the ad server 404 (step 515), which provisions a zone for the service and assigns a unique identifier (step 520). The advertising service provider 402 may associate the zone with one or more mobile subscribers (specified by, for example, MSISDN or other equivalent identifier). This association performed at the ad server 404 will trigger an association request to the zone server 406 (step 525), which in turn will create a corresponding zone slot for registration on the mobile radio terminal(s) 408 that were associated with the zone (step 530). The mobile radio terminals 408 may acknowledge creation of the zone slot to the zone server 406 (step 535), which may then notify the ad server 404 (step 540). The ad server 404 may then notify the advertising service provider 402 (step 545).

The mobile radio terminal 408 may take radio signal measurements as described above within the desired zone. The zone may be defined as any suitable area. For example, in an advertising zone for the retailer 400, the boundaries of the zone need not be entirely the physical space which is the store. It may be desirable to define an advertising zone for a store that covers a space nearby (but not including) the store in order to detect users walking along a busy sidewalk near the store.

Once the mobile radio terminal(s) 408 perform the radio signal measurement process for the zone, they may transmit a zone registration request (as described above) to the zone server 406 (step 550). The zone server 406 then processes the measurements and generates a zone profile (step 555). Upon generation of the zone profile, the zone server will notify the advertising server 404 that the zone profile is activated and ready for use (step 570). For verification of the zone profile, the zone server 406 may optionally transmit the zone profile to the mobile terminal(s) 408 that generated the measurements (step 560), which will acknowledge receipt of the zone profile to the zone server 406 (step 565).

As illustrated in FIG. 10, once the zone profile is created the advertising service provider 402 will associate users with the zone on the advertising server 404 (step 610), which in turn transmits a request to associate the users with the zone on the zone server 406 (step 615). The advertising server 406 will then establish associations between subscribers and relevant zones (step 620). This will trigger the zone priority evaluation process described above for the affected subscriber(s) and may result in one or more zone profiles being installed or updated on the subscribers' mobile radio terminals. The zone server 406 may itself define other zones required to implement the hierarchical zone monitoring scheme, i.e. zones which are not directly associated with a particular retailer but which instead represent a larger geographic region. For subscribers that will have the zone profile installed, the zone server 406 transmits the zone profile to the appropriate mobile radio terminals 600 (step 625). The mobile radio terminals 600 may acknowledge receipt of the zone profile to the zone server 406 (step 630), which may then notify the ad server 404 of successful provisioning (step 635). The advertising server 404 may then notify the advertising service provider 402 of the successful provisioning (step 640).

The mobile radio terminals 600 will then monitor the zone status of the active zone profiles stored on the terminal. When a mobile radio terminal(s) 600 enters a zone which their terminal is monitoring, the application will cause the terminal(s) 600 to transmit an alert to the zone server 406 (step 645). Depending on the type of zone, the zone server 406 may in turn transmit the alert to the ad server 404 via a zone state change notification (step 650). However, in certain aspects in which zones merely define the layering scheme there might be no alert to the ad server. Additionally, the zone server 406 may acknowledge the alert to the mobile radio terminal(s) 600 (step 655). The notification may cause the ad server 404 to initiate a transaction with the mobile radio terminal(s) 600 such as sending an SMS bearing a coupon or advertisement for the associated retailer 400 (step 660).

Figure 11:
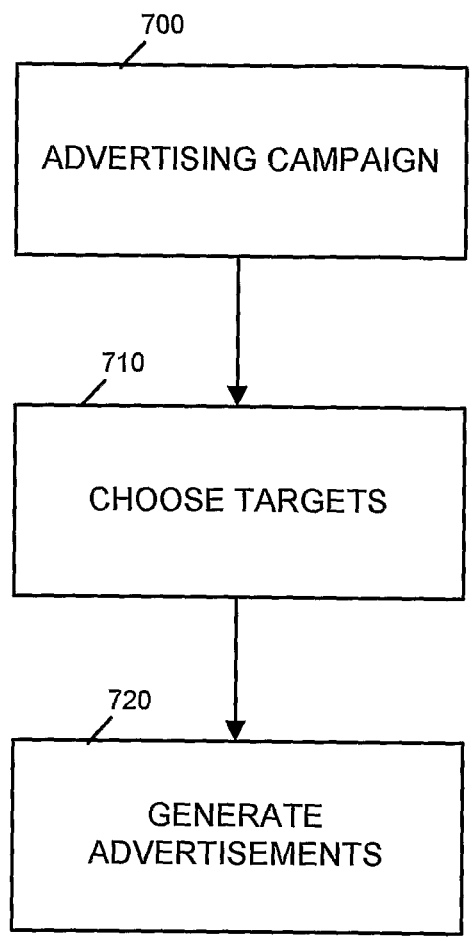
FIG. 11 illustrates a method of generating advertisements in accordance with certain embodiments.

FIG. 11 illustrates a method for generating and sending customized advertising messages to users according to an embodiment of the invention. The method starts with an advertiser initiating a promotional campaign with the host of advertising server 270 of FIG. 6. The advertiser specifies the parameters for the customized promotional campaign (step 700). For example, the advertiser may specify a budget (e g., $1,000) for a one-time promotion of a product. The advertiser may also specify a minimum, maximum or average number of users it wishes the advertising message to reach (which is also generally dependent on the budget), the location(s) of registered mobile terminal users in which vicinity the advertising message should be distributed (e.g., within a particular mall or store, within a particular neighborhood, city, etc.), and the time of distribution (e.g., distribute to early bird shoppers before 11 a.m. only).

Next, server 270 determines the potential customers who should receive a particular advertising message based on the profiles of the mobile terminal users that are maintained in mobile user profiles database 280 (step 710). For example, some users may not want to receive advertising messages about jewelry but do want to receive advertising messages about electronic equipment. If a particular user does not wish to receive certain categories of advertising messages, advertising messages will not be sent to them.

The advertiser itself could limit the number of targeted users based on various criteria, such as user preferences specified by the advertiser—including demographics, areas of interest, age, user income, etc.—and/or specified context-of-use data, which includes data like current location of users, current user" predetermined business schedule (so that offers are only extended during non-working hours of the user), and users who previously redeemed coupons such as electronic coupons that were previously sent in advertising messages. Other possible criteria that may be used to limit the number of targeted users comprise profiles of the terminals available to receive advertising messages, the approximate time of day an advertising message is to be sent, the business density at a particular time (i.e. how busy an advertiser is at a particular time), and advertising campaign limitations such as budget limitations. Moreover, the potential customers who receive the advertising messages may be randomly selected or limited to previous customers, or the advertising messages may be distributed for utilization by a specifically limited number of customers who avail themselves of the offer on a first-come, first-served basis. Or, where the advertising messages are to be distributed in a specified local area, server 270 may be instructed to limit the number of potential customers who will receive the advertising messages to fewer than the overall number of current, registered users in the specified local area. The advertiser can actually specify a maximum limit on the number of persons to whom advertising messages are sent to keep within a particular budget for an advertising campaign or, as will be explained further below, to insure that any electronic coupon in the advertising message have a minimum or maximum value.

After determining who will receive a particular advertising message by location, profile, etc., the system dynamically generates the advertising message in accordance with advertiser-specified criteria (step 720). The value of any discount or promotion offered by the any electronic coupons in the advertising message may be assigned to the electronic coupons at the time that the advertising message is dynamically generated. (The value of the electronic coupon can be provided in the form of any type of special offer such as, for example, as a monetary amount to be deducted from a regular sale price, a reduced price offer on an item, a free item, an amount of points to be rewarded for making a purchase which points can be redeemed for another item, etc.) The value may be dependent on one or more criteria, such as the promotion's budget, the number of persons to whom the advertising message is to be sent and/or the level of business at the advertiser. According to this latter criteria, the advertiser can, for example, modify the discount according to the prevailing situation in the business. When the advertiser is busy, such as at rush hour times, the discount could lower. By offering bigger promotions during less busy times, the advertiser can try to balance out and stabilize the store's business utilization throughout the day.

As an example, a merchant Pizza Shop wants to broadcast an advertisement containing electronic coupons to users of mobile terminals who are near the retail establishment of the Pizza Shop between 5 and 7 p.m. At least some of these users may have previously registered with Pizza Shop to receive advertisements at their mobile terminals. Pizza Shop decides to offer a promotional discount to a target audience that includes all registered users within a zone defined to be within 500 meters of its premises. Pizza Shop specifies a budget for this particular promotion of $1,000. Advertising server 270 determines how many registered users presently are in the targeted audience and the server 270 then establishes the maximum number of users that will receive the advertisement based on the budgetary constraints. Alternatively, instead of specifying a budget before determining the amount of each electronic coupon, an advertiser may first inquire of the advertising server 270 how many current users meet the specified criteria of the campaign and the advertiser can then decide on the scope and amount of the promotion. In this example, allowing the advertiser to place a total limit on the total number of users who receive these electronic coupons can prevent the generation of coupons that have too insignificant a value, as would happen if for example 50,000 users were eligible to receive the coupons and the $1,000 budget had to be divided among all those users.

Certain embodiments of the present invention may collect statistics for various purposes. For example, the average number of cache management related SMSs may be collected to enable the system to be optimized. Additionally, click-through rates of mobile advertisements may be collected (as a function of various characteristics) to enable offers and campaigns to be tuned.

In another exemplary embodiment, the systems, methods, and devices disclosed may be used to deliver, alert, or activate voice and/or data communications to subscribers in a particular geographic region or zone if there is an incident in that or a nearby region (e.g., an emergency situation or a traffic alert). These embodiments may include one or more mobile radio terminals in communication with the radio transceiver of radio telecommunications network having defined zones A, B and C, zone server, urgent message server, and optionally user profile database server. The user profile database server may be incorporated in the urgent message server or may be a separate server and may communicate with the urgent message server and zone server to transmit messages to mobile terminals.

A network may be linked to and communicate with the urgent message server that can dynamically generate messages, such as emergency alerts or traffic alerts, to be transmitted to subscribers in a targeted fashion. The urgent message server may contain a current service utilization database that can serve as a central register that maintains records of the current messages and message providers (e.g., local government officials) that are being, or are scheduled to be, distributed. Moreover, the server may contain any predetermined portions of the content of the messages to be distributed. The server may be, for example, a centralized entity, like the service provider of the mobile network, an application service provider (ASP), a broker (which has several accounts), or the entity that is sending the message. In alternative embodiments, rather than connecting a server directly to the mobile network, the mobile network may be linked to the Internet and the server may also be linked to the Internet.

Utilizing this system, it would be possible for local government officials to notify subscribers of emergency situations in the subscriber's current geographic location without having to send a message to all users. That is, if there is an emergency situation in zone A, it may only be necessary to notify subscribers in zone A and zone B, but not in zone C (e.g., zone C may to be too remotely located). Additionally, as additional subscribers approached the location of the emergency situation, the system would generate a message that alerted these additional subscribers of the situation. In this manner, the message would be more effectively distributed to those subscribers that would find the alert relevant. For example, if the user in zone C was across town, that subscriber may not have any interest in a traffic jam or building fire on the other side of town. Alternatively, a subscriber in zone A would be interested in knowing of the incident if it was in Zone A and a subscriber in zone B may also be interested if zone B was nearby and the subscriber was heading into zone A.

In some embodiments, the message may also alert subscribers of certain courses of action. For example, the message may indicate a traffic accident on a particular street and advise users to use a specific alternate route. In some embodiments, the specified route may be updated as traffic on the first route becomes more congested. Therefore, not only is the message being spatially limited, it may also be temporally limited or modified.

All of these variations can be adjusted within the system. For example, if it was desired, the message could be transmitted to all subscriber in any number of zones (e.g., an entire city).

A wide variety of mobile social games have been developed for mobile radio terminals such as Pac-Manhattan, I Like Frank in Adelaide, and CitiTag. In another exemplary embodiment, the systems, methods, and devices disclosed may be used to operate a mobile location based game. The architecture for a mobile location based game would be similar to that described above for an advertising application. Instead of an advertising server, however, there would be a game application server. It is also contemplated that the systems, methods and devices disclosed herein could support multiple applications, for example, combining a mobile advertising application with a mobile location game application. The game application server would provision subscribers (i.e. the game players) and associate them with zones as required during the course of the game.

Research into consumer acceptance of mobile advertising and other location based services has shown that a requirement, in some circumstances, for such services to be successful is for the system to not be perceived as invading consumers' privacy. Many aspects of the present disclosure address this issue. For example, mobile terminal users may register with the system, it may be implemented in an opt-in or an opt-out manner, and the application may present various prompts to the user as described below.

The specific zones to be associated with a subscriber may be determined based on a subscriber profile. To generate this profile, subscribers can be required to register with the system in order to receive mobile advertisements and/or for other location based services. Regardless of whether registration is required, any subscriber profile information the subscribers provide, including subscribers preferences, such as at the time of registration, may be stored in the ad server 250, or in a mobile subscriber profiles database 280. A mobile subscriber profiles database 280 enables the system to limit the sending of advertising messages to registered mobile terminal subscribers who are in the vicinity of an advertising entity and who indicate certain subscriber preferences. The subscribers' profiles in database 280 may be compiled in any way such as by a central entity like an advertisement broker who collects various types of user information in any number of ways, or by the advertiser who collects the information itself, such as through a company web site maintained on the Internet where customer preferences are solicited. Mobile subscriber profiles database 280 may thus contain subscriber-defined information, such as information identifying the mobile terminal subscribers, their demographics, each user's annual income and buying power, preferred types of goods and services and special offers, etc., and may also contain information collected about the users based on previous usage of the inventive system or other means of gathering user profiling information. Alternatively, data relating to a particular subscriber's preferences may be stored in memory of the particular subscriber's mobile terminal 220. The subscriber profile data may be organized in several levels, generally corresponding to different levels of security clearance, such that specific advertisers have access to one or more levels of the user profile while completely confidential subscriber information, such as the subscriber's social security number, if provided, may only be available to the manager of database 280.

Subscriber registration may involve, for example, a web portal that allows subscribers to specify areas of interest, demographic information, psychographic information, income etc. The web portal may be operated on the advertising server 250 or may be hosted on another server. The web portal may allow subscribers to review the types of advertising zones available and indicate their level of interest in those zones. Subscribers could also indicate a region within which they are interested in advertisements. Subscribers could also explicitly mark types of offers/zones which they do not wish to be associated with. Subscribers may be able to choose from available retailers' zones, plus other zones of interest. In some embodiments, subscribers could register for community alerts, for example a community notice board. Each subscriber may also specify information about when he or she is unavailable or does or does not wish to receive advertising messages (e.g., a subscriber may specify that he or she does not wish to receive advertising messages at his mobile terminal while at work during specified hours and/or may specify other user-specified criteria about the context in which the user wants to receive advertising messages.) The subscriber may be able to specify the number and frequency of advertising messages they will receive, and the type of messages they want to receive (e.g., sports-related, or news-related). The subscriber may also be able to specify locations where they do not want to receive advertising messages (e.g., at home or at the office).

Another way embodiments of the present invention address subscriber privacy concerns is to implement a user opt-in or opt-out regime for mobile advertisements. For example, in an opt-in regime, the zone provisioning and monitoring application may be, for example, a dormant applet on a SIM card. If the subscriber sees an ad that they are interested in, the subscriber may call a specified number speaking with a customer care agent or event an IVR to complete the subscription process. Alternatively the subscriber could SMS a specific number to indicate their desire to enroll in the service. This could trigger a response message from an application server to the mobile terminal to activate the application on their SIM card. Alternatively, the application may be active on the card already but with only one menu entry (subscribe) visible. In the case of non-SIM based applications, the application could be made available for download from a web portal via, for example, WAP. Any interested subscribers could then download the application, install it on their handset and activate it. Yet another alternative is for the system to transmit a message to the user bearing a hyperlink which enables the subscriber to download and install the application. In other embodiments the subscriber's action might cause the system to immediately download the application wirelessly and install it. In the case of a SIM based application, this could be done using an OTA server. On installation, the application could present a message confirming that the subscriber is now activated for the service. In the case of a terminal based implementation, the application could be transmitted via MMS and installed.

In an opt-out regime, the subscriber could select a menu entry that would cause the terminal to transmit an opt-out message to the zone server. This opt-out message would cause the server to disable the service for that user and deactivate the application on their SIM card. For non SIM based applications, the subscriber could select an opt-out menu on the application which would notify the zone server and also deactivate all processing related to the service on the terminal.

To address privacy concerns, certain embodiments may provide prompts to the user. For example, the mobile terminal may periodically inform the user that they are participating in a location based advertising service. Additionally, when a zone entry event is triggered, the mobile terminal may present a dialog to the user requesting permission to forward the zone alert to the zone server, thereby triggering the corresponding alert. If the user declines the request, a further option may be presented offering them the option to permanently block any alerts for this zone. If the user chooses this option, the application notifies the zone server, which may then deactivate any association between the subscriber and that zone and convey this information to the ad server.

In certain embodiments, the interface between the ad server and the zone server may incorporate an anonymization feature in order to withhold the details of individual subscriber location and movement from the advertising service provider, thereby maintaining a higher level of protection for the subscriber privacy. In this case, the zone server and the ad server exchange information about the associations between subscribers and zones in order to configure ones for monitoring. However when an individual subscriber enters a zone, the zone server alerts the ad server that the zone has been triggered by a subscriber (without revealing which specific subscriber). The zone server may employ a temporary subscriber id in alerting the ad server. The ad server then responds with the zone related content to be delivered to the subscriber, specified using the temporary id, and the zone server forwards the content to the specific subscriber by translating the temporary ID to a full ID. In embodiments operating using this feature, the collection of statistics such as click through rates etc. would be done in aggregate fashion without specific information about subscribers and their preferences.

Embodiments utilizing this feature could architecturally be implemented as described above, wherein the zone server maintains the information about user details and location. Alternatively, embodiments could utilize a messaging node ($3^{rd}$ node), which receives from the ad server the content to be sent and then uses the temporary subscriber ID to lookup from the zone server the specific address to send the content to.

In certain embodiments, the system for administering zones and distributing them to clients may be operated in a client-centric manner. This type of approach may be preferable for deployments where the zone monitoring is implemented by a client application executing on a connected device such as a smartphone that has sufficient memory and CPU processing capacity available. For applications where it is a requirement to serve users subscribed to more than one wireless access provider, such an approach enables the differences between wireless networks to be managed transparently from the user. This capability may be crucial in certain applications such as advertising or social networking where the target population cannot be reached through a single cellular carrier or other wireless access provider.

As with the embodiments described above, the zone definitions are maintained in one or more network based databases and distributed to clients as appropriate based on their preferences and location. In these embodiments, however, the responsibility for transferring definitions to user devices for monitoring, and maintaining those definitions as the user moves is transferred from the zone server infrastructure onto client software executing on the user's device. The zones stored on the mobile terminal for monitoring may be selected exclusively by the user. Alternatively a mix of user defined as well as system selected zones may be installed. The techniques described above for selecting a subset of zones from a larger set based on proximity can also be applied in this case, with the location estimate used to perform the proximity filtering being calculated using measurements supplied by the client at the start of the update process.

This approach can be used to implement a location based mobile advertising service. Other location based services can also be implemented in this manner including for instance a social networking service. Preferably one or more other user centric services such as social networking can be integrated with a mobile, location based advertising service enabling the insertion of relevant (and therefore commercially valuable) advertisements within the context of a popular and frequently used service.

In certain embodiments, the client software provides a user interface (UI) that enables the user to manage the service, which may include one or more of the following capabilities:

associate with one or more zones, which causes a suitable definition corresponding to that zone to be downloaded to their handset for monitoring.

disassociate from a zone define a new zone and upload to the zone server. For this aspect, the UI could include a page to enable entry of zone parameters such as location, size, policies such as security settings, actions to be carried out on entry/exit.

delete a zone disable a zone re-enable a zone modify one or more parameters associated with a zone.

refresh a zone definition (take a new set of radio measurements to define the zone, if the wireless network configuration has changed)

Figure 12A:
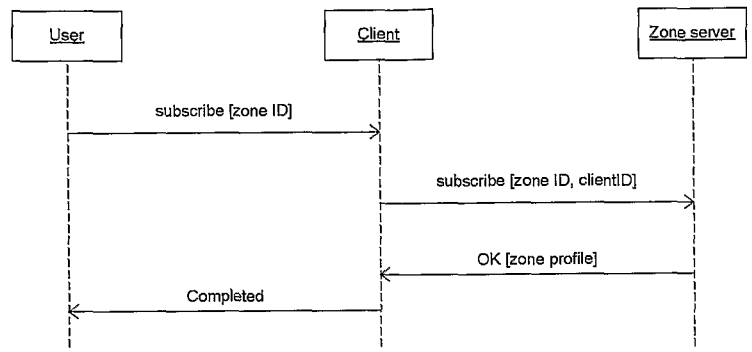
FIGS. 12a to 12e illustrate exemplary sequencing diagrams of user interactions with a client and various servers in accordance with certain embodiments.
Figure 12B:
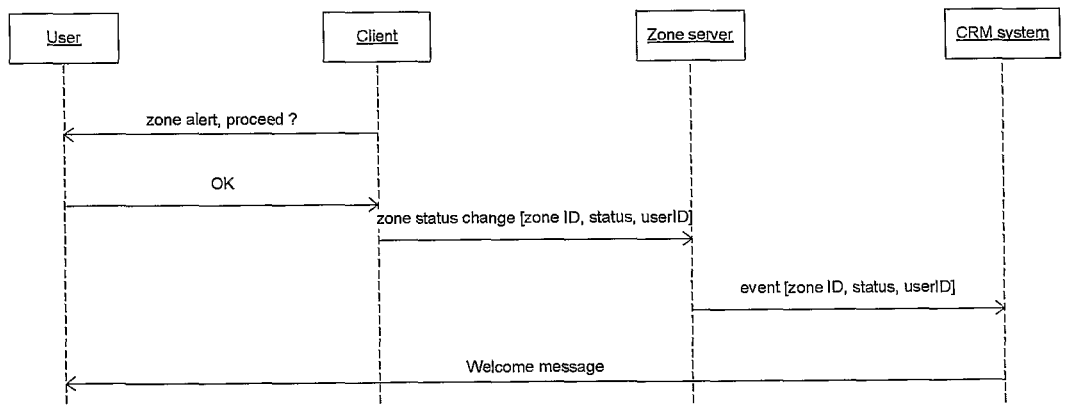
Figure 12C:
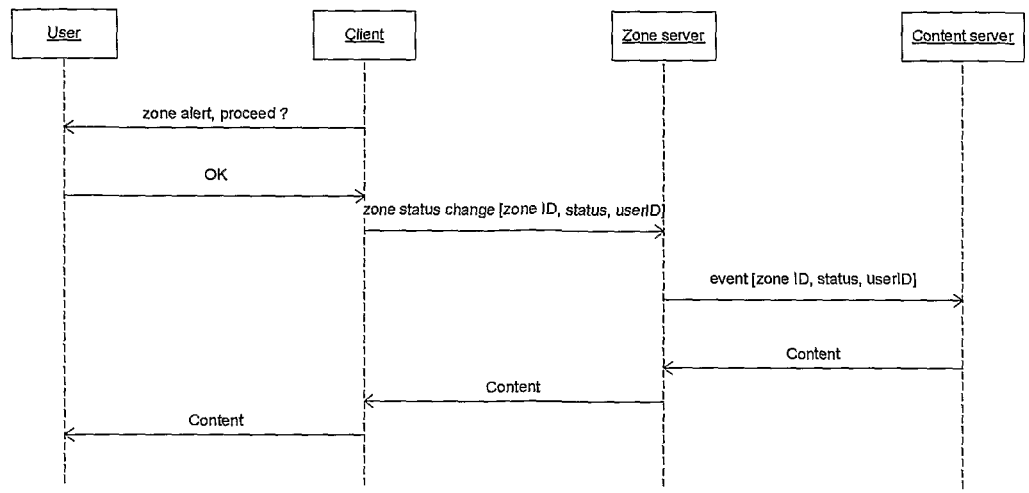
Figure 12D:
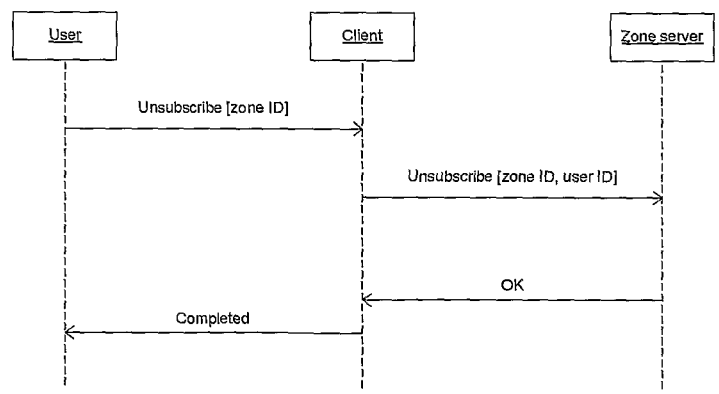
Figure 12E:
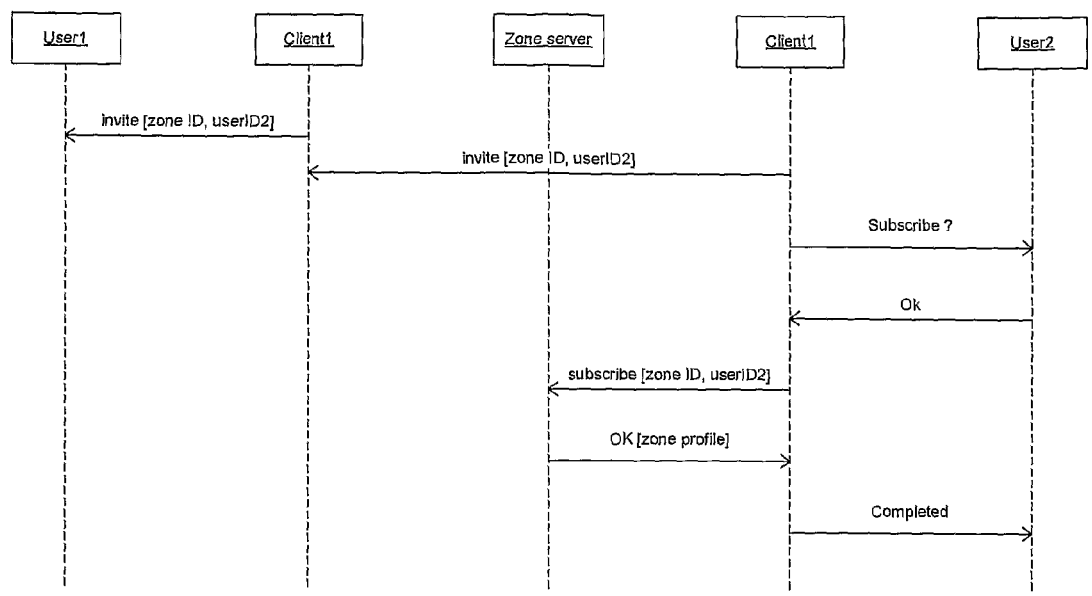

For example, FIG. 12a illustrates an exemplary sequencing diagram of a user subscribing for a zone in accordance with certain embodiments. FIG. 12b illustrates an exemplary sequencing diagram for sending a user a welcome message from a CRM server upon the client identifying a zone status change in accordance with certain embodiments. FIG. 12c illustrates an exemplary sequencing diagram for sending a user content such as, for example, an advertisement or game content, upon the client identifying a zone status change in accordance with certain embodiments. FIG. 12d illustrates an exemplary sequencing diagram of a user unsubscribing from a zone in accordance with certain embodiments. And FIG. 12e illustrates an exemplary referral of a zone from one user to another user of a social networking application in accordance with certain embodiments.

Preferably, on devices that include a calendar facility, the client software integrates with this facility to provide a familiar interface for managing temporal aspects of zones, including defining activation times for zones. One or more of the following parameters can be included in a zone definition:

Location (geographical)

Size (radius in meters)

Activation times (can be between certain hours only, on certain days only)

One time or repeating daily or weekly

As described above, the zones may be defined in terms of the wireless observations that are available to the client for monitoring location. Multiple realisations of the same zone can be established covering different wireless networks. The server identifies the zone via a single identifier and manages the different realisations of the zone definition for different wireless networks and devices together with the client transparently to the users. For deployments in connection with multiple wireless networks, the client identifies the network which it is currently served by in order to retrieve the realisation of the zone definition for that particular wireless network. For example, a client executing on a device registered on the Vodafone Australia network would supply the MCC (505) and MNC (3) when retrieving a zone profile, enabling the zone server to provide the relevant definition for that network. For a different user of the Telstra network for instance, the client executing on the device would submit MCC & MNC of 505 & 1 respectively. The realisations or network specific definitions may extend beyond the different carriers using a specific technology to cover all wireless networks in the area, encompassing for instance GSM/UMTS, CDMA, WIMAX and WIFI. The client also indicates other capabilities of the device such as the availability of a built-in GPS or Wi-Fi network adapter. This can be done in a way that is transparent to the user, meaning that the service can operate across multiple networks, with or without the aid of GPS and without the users having to be aware of the details of their respective carriers' networks.

Optionally the zone server may provide a directory service, for instance via a web interface to support a discovery function. Users can browse or search this directory for zones of interest to them. Having located a zone of interest, the user can enter the corresponding zone identifier into their client to subscribe to it.

Zones are distinguished by a unique identifier. The identifier assigned to a zone can be any unique combination of characters. In certain embodiments it may be preferable to use purely numeric identifiers.

In certain embodiments, it may be convenient for users if the identifiers are associated with a recognisable name or even a web URI. As an example, a web service (e.g. web APIs that are accessible via the Internet that are hosted on a remote server) could be established with a specific URL, e.g., a domain name of "zoneserver.com." The web service could produce a UI allowing users to easily access and browse stored zone profiles. The web service could enable each user to create a user account and create access controls as described below. A user interested in creating a zone profile could access the web service UI via a web browser and create web folders that contain the desired zone profiles. A user interested in obtaining a zone profile could then browse to the web service and retrieve any desired zones. For example, in an advertising context, if a restaurant, e.g., McDonalds®, wanted to create zones to automatically alert passersby of specials when they entered a zone near one of their locations, a representative could log on to the zoneserver.com website, create an account, and upload zone profiles corresponding to the appropriate locations. For instance a zone definition associated with a McDonalds restaurant situated in Glebe in Sydney could be assigned an identifier of the form www-.zoneserver.com/mcdonalds/au/glebe/52363. An interested consumer could then browse to the zoneserver.com website to download the appropriate zone to their handset. Alternatively, a user could obtain the URL for the restaurant's zone by, for example, browsing to the McDonald's website on their handset, performing a Google Maps™ search for nearby restaurants in the vicinity of the restaurant, receiving an SMS from an advertiser, or any other suitable technique. It is contemplated that these embodiments may be suitable for a great number of other applications such as, for example, social networking (e.g., posting a zone profile near the owners current location and allowing friends to know when they are nearby), civic information updates (e.g., the local county government could post URLs to zones for fairs or other activities on their website), and local emergency updates (e.g., the local police department could post alerts of terrorist threats). As will be appreciated, such a technique of associating the zone profiles with URLs can provide great flexibility and usability. Such a technique may also have advantages over identifying zone profiles using latitude-longitude-radius data or even street address data because it will typically be easier for users to understand.

Another extension from the service described previously for implementation on a SIM card may be that the action to be taken when the zone is triggered can be configured with greater flexibility. One or more actions can be configured. One example is sending an SMS to a configured number. This might be useful for instance to enable a guardian to receive an SMS when a child reaches a location. An alternative could be sending an email to a configured address, perhaps a retailer's customer service address, enabling them to follow up on the user that entered a retail zone. Yet another alternative is an automatic 2-way callback, where the zone server passes a request to a telephony service which dials a customer enquiry number and connects the other leg to the user who triggered the zone. Other media could also be used such as sending an Instant Message. The options also extend to automatically triggering the provision of predefined content to the user. As an example, when a user triggers a retail zone, the zone server could transmit some predefined content via either SMS, MMS, email or other push media to the user.

A further option is for the client to be designed to not only transmit the zone status alert to the zone server, but depending on the configuration of the zone definition, to optionally pull some content from the server or even to launch a browser, directing it a landing zone associated with the zone. Yet another option is for the client to display some content to the user locally in the form of a splash screen or banner on the idle screen. Such content could be retrieved from local storage on the device, that content being synchronised with a server from time to time when the user connects to the network.

As described above, the zone server in this case provides a variety of mechanisms to enable zones to be defined, published, and controlled. For user defined zones, the zone server can enforce access controls, preventing other parties from accessing or modifying the zone. In addition, the owner of the zone can control the ability to subscribe to the zone. As an example for a social networking type of service, subscription requests could first be forwarded to the owner of the zone for approval. Once approved, the confirmation could be forwarded from the owner to the requesting client.

Preferably the zone server maintains an 'account' for each registered user. When the user connects to the service using the client on their device, the client refreshes its list of zones, in a similar fashion to email clients on mobile devices. Any changes applied by the user on the device while disconnected are updated on the server and any changes applied on the server are updated on the client. Such changes could include new zone subscriptions for instance.

The client can also provide the user the capability to define a new zone as previously described. Using the client, the user can collect radio measurements around the area to be covered by the zone. When completed, the zone measurements are submitted to the zone server to complete the zone definition using any suitable transport and application protocol including SMS or packet data. Preferably for packet data compatible devices the client submits the measurements to create the zone definition in a HTTP request to the zone server.

Alternatively the zone server can enable a zone to be defined purely by defining the location and extent of the zone using a web service. The server can provide a mapping interface where the user can navigate to the location of interest and mark the location and extent of the desired zone. The server also provides a page where other zone parameters such as time limits & permissions can be entered. In certain cases, a retailer may register zones characterising one or more of their store locations. These zone definitions will be maintained in the central zone server. The retailer can publish the identifier(s) for one or more zones enabling users to register for these zones. Thereafter if the user carries their device near one of the store zones, the user's client will detect this and will send an alert to the zone server, which in turn can follow the configured actions which in this case could mean proxying the alert to the retailer's customer relationship management (CRM) system, along with the identifier of the user. The CRM system can then transmit an offer or alert a customer service representative, if that particular user is a priority customer.

The same service can be operated by a mall owner on behalf of multiple retailers within the mall. The mall could establish zone definitions covering the physical location of the mall and publish these to enable subscribers to subscribe to the zone in order to automatically notify the mall registry when they arrive at the mall and retrieve any special promotions at that time. The location triggering can be integrated with a CRM system holding details about that user's preferences in order to enable only selected promotions of particular relevance to the user to be pushed to that user.

Certain embodiments disclosed herein provide systems and methods for triggering communication between a mobile terminal and another entity based on the location of the mobile terminal. Certain embodiments permit the systems and methods disclosed herein to be cost effectively scaled up to manage multiple mobile terminals, multiple zones, and multiple voice and/or data communications to or from the a radio terminals based on the radio terminal being within a certain geographically location.

Compared to existing systems, the present inventions enable this triggering to be done with finer spatial precision; continuous monitoring of mobile terminal location with lower battery impact, lower network signaling load, and minimal network processing load; coverage both indoors and outdoors; and easy scalability to large numbers of users with lower infrastructure costs. Tables 8 and 9 below illustrate the advantages of embodiments of the present disclosure over existing systems that could be used to continuously monitor multiple radio terminals.

TABLE 8

| Technology | Mobile Battery Drain | Network Signaling and Processing Load | Network Infrastructure Cost | Accuracy |
| --- | --- | --- | --- | --- |
| Disclosure | Low | Low | Low | High |
| GMLC supporting enhanced position methods such as E-OTD, TDOA or NMR | Low | High | High | High |
| Cell ID | Low | High | Medium | Low |
| AGPS | High | High | High | High |
| GPS | High | Low | Low | Low in cities |

TABLE 9

| Technology | Mobile Battery Drain (decrease in standby time) | Network Signaling and Processing Load | Network Infrastructure Cost | Accuracy (while achieving reliability >90%, both indoors & outdoors) |
| --- | --- | --- | --- | --- |
| Disclosure | <10% | <5 msgs per ad delivered | <$0.20 per advertisement | <500 m |
| GMLC supporting enhanced position methods such as E-OTD, TDOA or NMR | <10% | 4 msgs per subscriber per hour regardless of ads delivered | >>$0.20 per ad | <1000 m |
| Cell ID | <10% | 4 msgs per subscriber per hour regardless of ads delivered | <$0.20 per ad | <5 km |
| AGPS | >>20% | Fixed number of msgs per subscriber per hour (requests from the device for assistance data) regardless of ads delivered, plus 1 msg per ad zone detection | >$0.50 per ad (additional cost for the A-GPS server & associated signaling). | <200 m outdoors and in some urban areas, no coverage deep indoors |

TABLE 9-continued

| Technology | Mobile Battery Drain (decrease in standby time) | Network Signaling and Processing Load | Network Infrastructure Cost | Accuracy (while achieving reliability >90%, both indoors & outdoors) |
|---|---|---|---|---|
| GPS | >>20% | 1 msg per zone detected (ad delivered) | <$0.20 per ad | <100 m outdoors, but no coverage in urban areas & indoors |

In the case of a mobile advertising application subscribers' proximity to target locations can be monitored continually and with fine spatial resolution when required. From an economic point of view, the use of the subscriber's terminal to perform the location monitoring saves the very large expenditure that would be required to achieve the same monitoring capability from the network side. The fact that network traffic is limited to only those occasions when the subscriber does enter a target location, yields significant spectrum efficiency.

A further advantage of certain embodiments are the adjustable precision of the target zones from very small areas of a few meters up to large areas.

Yet another advantage of certain embodiments is that the definitions of the zones can be automatically updated to account for changes in the configuration of the radio network.

Another benefit of certain embodiments are that they permit a large number of zones and/or zones sizes to be defined and managed for each subscriber within the finite processing & storage constraints of current mobile terminals.

Another advantage is that hierarchical cache management techniques are disclosed that help to maximize the number of zones stored on the phone that are likely to be triggered while simultaneously minimizing the network traffic associated with changing zones (i.e., thrashing).

A further advantage of certain embodiments is that, if desired, there is no continual recording of subscriber location, such as there would be in the case of a network based polling system. Instead, the only transactions which take place are those when the subscriber enters a target zone. This means that any locations which are recorded will be for a discrete set of retail locations. In this case the subscriber will also receive an offer of some kind which may be deemed by them to constitute fair exchange for having revealed their location to which it refers, and is not meant to exclude the presence of any additional features unless otherwise stated or implied.

Another advantage of certain embodiments is that, from an economic standpoint, the use of the subscriber's terminal to perform the location monitoring saves the very large expenditure that would be required to achieve the same monitoring capability using a network based monitoring system. Because network traffic is limited to only those occasions when the subscriber enters a target location, yields significant spectrum efficiency.

Another advantage of certain embodiments is that a plurality of radio terminals and a plurality of zones can be operated in a network without overusing the resources of the terminal or the network, for example using too much battery power from the terminal.

Another advantage of certain embodiments is that a plurality of radio terminals and a plurality of zones can be operated in a network without excessive attendant cost and consumption of network bandwidth.

Another advantage of certain embodiments is that a dwell time criteria may be added to zones. This beneficially may prevent triggering of a zone when a subscriber is rapidly passing through an area.

In addition, there may be several advantages of embodiments of the present disclosure for social networking services, compared to alternatives such as a Gears enabled web application. In the latter case, location monitoring requires frequent connections by the mobile device to refresh it location, consuming battery power, incurring data costs and perhaps most significantly leaving a trail of locations. By contrast, embodiments of the present disclosure can implement the location monitoring on each uses device. Without the requirement to continually calculate location for each active user, the infrastructure capacity (and cost) is substantially reduced. The user also incurs no ongoing data charges associated with the location monitoring. Finally, the client does not betray the location of its user continually. Instead only when the user is in a location of interest and chooses to allow the client to transmit a zone alert is their location conveyed to any third parties.

Another advantage of certain embodiments may be that associating the zone profiles with URLs can provide great flexibility and usability. Such a technique may also have advantages over identifying zone profiles using latitude-longitude-radius data or even street address data because it may be easier for users to understand.

The exemplary approaches described may be carried out using any suitable combinations of software, firmware and hardware and are not limited to any particular combinations of such. Computer program instructions for implementing the exemplary approaches described herein may be embodied on a tangible computer-readable medium, such as a magnetic disk or other magnetic memory, an optical disk (e.g., DVD) or other optical memory, RAM, ROM, or any other suitable memory such as Flash memory, memory cards, etc.

Additionally, the disclosure has been described with reference to particular embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents which fall within the range of the claims are intended to be embraced therein.

The reader's attention is directed to all papers and documents which are filed concurrently with this specification and which are open to public inspection with this specification, and the contents of all such papers and documents are incorporated herein by reference. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers, unless otherwise implied.

The reference to any prior art in this specification is not, and should not be taken as, an acknowledgement of any form of suggestion that such prior art forms part of the common general knowledge.

The invention claimed is:

1. A method of monitoring zone statuses for a plurality of mobile radio terminals comprising the steps of:
    providing a plurality of zones to a plurality of mobile radio terminals, each zone having a zone profile;
    storing each zone profile;
    receiving a message comprising a zone status update from at least one of the plurality of mobile radio terminals, wherein a zone status is determined by measuring radio signal parameters and comparing the radio signal parameters with at least one zone profile; and
    if the zone status has changed, transmitting content associated with the zone to a mobile radio terminal;
    wherein providing the plurality of zones comprises:
        associating a plurality of zones with at least one mobile radio terminal associated with a subscriber based on a subscriber profile;
        provisioning the plurality of zones to the at least one mobile radio terminal; and
        making available to the subscriber a subset of the plurality of zones responsive to a determination that there is insufficient space available for all of the plurality of zones on the at least one mobile radio terminal.

2. The method of claim 1 wherein the content is an advertisement.

3. The method of claim 1 wherein the content is game content.

4. The method of claim 1 wherein the content is community based information.

5. The method of claim 1 wherein associating at least one zone with at least one mobile radio terminal further comprises the steps of: determining a subscriber profile; and filtering a plurality of zones to determine zones corresponding to the subscriber profile.

6. The method of claim 5 wherein the subscriber profile is stored in a subscriber profile database.

7. The method of claim 2 wherein providing a plurality of zones consists of transmitting zones to the plurality of mobile radio terminals via SMS.

8. A method of monitoring and managing zone profiles stored on a plurality of mobile radio terminals comprising the steps of:
    storing a plurality of zones, each zone having a zone profile;
    associating at least one of the zones with a plurality of mobile radio terminals,
    wherein associating at least one of the zones with a plurality of mobile radio terminals comprises the steps of:
        determining whether a current location of the associated mobile radio terminal is sufficiently known;
        tracking available space on the mobile radio terminal for a zone profile;
        if the current location is not sufficiently known, transmitting a request to the associated mobile radio terminal for radio signal measurements;
        calculating the current location for the associated mobile radio terminal based on received radio signal measurements;
        evaluating zone priorities based on the current location and
        determining whether any zone updates are required;
        if zone updates are required, transmitting at least one zone to the associated mobile radio terminal, wherein the at least one zone comprises a subset of the plurality of zones selected based on the available space on the associated mobile radio terminal;
    receiving a message containing a zone status update from the associated mobile radio terminal, wherein the zone status is determined by measuring radio signal parameters and comparing the radio signal parameters with the zone profile of the transmitted zone; and
    if the zone status has changed, transmitting content associated with the transmitted zone to the associated mobile radio terminal.

9. The method of claim 8 wherein the subset of the plurality of zones comprises at least one zone determined to be geographically closest to the current location of the associated radio terminal.

10. The method of claim 8 wherein the at least one zone is a hierarchical set of zones.

11. The method of claim 8 wherein the at least one zone is at least one large scale zone and at least one small scale zone.

12. The method of claim 8 wherein the at least one zone is a plurality of advertising zones.

13. The method of claim 8 wherein determining whether a current location is sufficiently known is performed at an interval.

14. The method of claim 8 wherein transmitting a request to the associated mobile radio terminal for radio signal measurements is performed responsive to the associated mobile radio terminal not having remaining memory capacity.

15. A method of monitoring a zone status comprising the steps of:
    receiving a plurality of zones, having a plurality of corresponding zone profiles;
    storing the plurality of zones;
    providing a plurality of zones to a mobile radio terminal associated with a subscriber;
    receiving a zone status message from the mobile radio terminal, wherein the zone status is determined by measuring radio signal parameters and comparing the radio signal parameters with the zone profile; and
    if the zone status has changed and a minimum dwell time of a mobile radio terminal has been reached, transmitting content associated with the zone to the mobile terminal
    wherein providing the plurality of zones comprises:
        associating the plurality of zones with the mobile radio terminal based on a subscriber profile;
        making available to the subscriber a subset of the plurality of zones responsive to a determination that there is insufficient space available for all of the plurality of zones on the mobile radio terminal.

16. The method of claim 15 wherein the minimum dwell time is at least 5 minutes.

* * * * *